United States Patent [19]

Brown et al.

[11] 3,895,276
[45] July 15, 1975

[54] A.C. ELECTRIC MOTOR AND INVERTER CONTROL SYSTEM

[76] Inventors: Buck F. Brown; James S. Tarbutton, both of Ruston, La. 71270

[22] Filed: Oct. 23, 1970

[21] Appl. No.: 83,333

[52] U.S. Cl. .................. 318/231; 318/227; 321/65; 321/69
[51] Int. Cl. ............................................. H02p 5/34
[58] Field of Search ......... 318/231, 227; 321/65, 69

[56]  References Cited
 UNITED STATES PATENTS

| | | | |
|---|---|---|---|
| 3,246,231 | 4/1966 | Clarke | 321/69 R |
| 3,355,647 | 11/1967 | Braus | 318/227 X |
| 3,416,057 | 12/1968 | Froyd et al. | 318/231 X |
| 3,493,838 | 2/1970 | Gyugyi et al. | 318/227 X |
| 3,603,866 | 9/1971 | Opal | 318/227 X |

Primary Examiner—T. E. Lynch
Attorney, Agent, or Firm—John M. Harrison

[57] ABSTRACT

A submersible, reversible, single or polyphase alternating current electric motor and control system which operates from a direct current supply at varying speeds, and draws current from this supply in proportion to the load placed on the motor. Positive directional positioning of the motor through 180° of rotation, speed control through an infinite range, and low maintenance alternating current operation is achieved by application of electronic circuitry designed to permit maximum performance with minimum control manipulation by the operator.

10 Claims, 10 Drawing Figures

PATENTED JUL 15 1975

3,895,276

SHEET 1

INVENTOR
Buck F. Brown
James S. Tarbutton

BY

ATTORNEY

A.C. ELECTRIC MOTOR AND INVERTER CONTROL SYSTEM

BACKGROUND OF THE INVENTION

1. Field of the Invention

This invention relates to a new electric motor and control circuitry for the motor. More particularly, the invention relates to a submersible, reversible electric trolling motor system for propelling watercraft which utilizes specially designated electronic circuitry to convert the direct current supply voltage into alternating current to operate the power and steering motor units. The system is characterized by positive speed control through an infinite range of speed settings in both forward and reverse operation, and positive directional positioning through a range of 180°, made possible by application of a maximum effort steering feedback control system. The motor is designed to operate essentially maintenance-free under submerged conditions and requires only a fraction of the power required to operate conventional electric trolling motors while running at low speeds.

2. Description of the Prior Art

Heretofore many different types of electric trolling motors have been proposed for use in marine environments under submerged conditions. These motors have been typically characterized as direct current, non-reversible machines requiring brushes and special sealing to prevent water from contacting and shorting motor components. Because elaborate precautions for preventing water leakage into the interior of the motor are necessary, and due to the inherent design characteristics of these motors, they are characterized by high maintenance requirements with accompanying high percentage of "down time." Furthermore, since the majority of these motors are not reversible, elaborate steering apparatuses must be contrived for reversing, and positive directional and speed control are difficult to achieve.

Electric trolling motors of the type above noted and the one included in this invention are typically used for slow propulsion of a boat while fishing. The trolling motor is useful as an auxially source of power for three primary reasons. First, because of the inherent design characteristics of an internal combustion engine, a motor of this type having sufficient size to move the fishing boat rapidly through the water is difficult to throttle down effectively or efficiently to a speed sufficiently slow to permit trolling. Secondly, the outboard motor inherently creates a large amount of undesired underwater noise, even while operating at relatively low speed. Thirdly, since the large outboard motor is almost universally mounted on the rear of the boat, maneuverability at low speeds is very difficult to achieve. Therefore, use of a second small auxiliary or trolling motor has become quite common for boats used for fishing. These motors are typically characterized by lightness of weight, quietness of operation, and favorable speed control features.

Conventionally, the electric trolling motor is mounted on the bow or one side of the boat to permit good maneuverability and to effect a more even distribution of weight in the boat. Through experience, fishermen have thus found that the best method of operating a trolling motor is to sit near the bow of the boat with the trolling motor mounted beside or ahead of them. This position allows a favorable load distribution in the boat, permits the fisherman sufficient freedom of movement, and contributes to the maneuverability of the boat.

The present invention overcomes the inherent shortcomings of prior art trolling by providing an alternating current, reversible power motor which in unaffected by submergence and needs no sealed housing to prevent water contact with the motor components. Since the motor of this invention is reversible, there is no necessity for providing an elaborate steering apparatus to effect a 180° turn on the motor for reversing purposes. In addition, because of the specially designed circuitry in the electric trolling motor of the present invention, positive steering and positioning control is effected by merely touching master controls. This convenience is in sharp contrast to conventional electric trolling motors which require extensive control manipulation to achieve desired directional and speed settings.

It is an object of the invention to provide an electric motor which will operate under submerged conditions and remain substantially maintenance-free, using the submerged medium, water, as the coolant.

Another object of the invention is to provide an improved electric motor which will operate on alternating current from converted direct current and is therefore reversible and susceptible of positive speed control over an essentially infinite range of speeds without drawing excessive current at lower speeds.

A still further object of the invention is to provide an electric motor for fishing purposes which is characterized by positive directional control initiated by a minimum of control manipulation.

Still another object of the invention is the provision of a trolling motor for fishing which utilizes a readily available direct current voltage source and safe, efficient, electronic circuitry to produce alternating current to drive the motor.

A further object of the invention is to provide a method of turning the motor system of the invention on and off without resorting to the use of high current carrying switches.

Another object of the invention is to provide an electric trolling motor for fishing, the power motor housing of which is designed to allow water to enter while operating under submerged conditions in order to effect cooling of the motor and to allow rapid drainage of the interior of the motor when it is raised from the water.

Still another object of the invention is to provide an electric motor system accomplishing speed control of the power motor unit by application of a cycloinverter circuit which is designed to prevent high current buildup in this unit.

Another object of the invention is to provide an electric motor and system for effecting simultaneous speed control of the power motor unit and the directional control system.

A still further object of the invention is to provide positive speed control of the power motor and steering motor by a cycloinverter design which allows variation of both the power frequency and the gating frequency to simultaneously change the speed of these motors.

SUMMARY OF THE INVENTION

The foregoing objects and other advantages hereinafter emphasized are realized in a broad aspect of the invention by the provision of an electric motor system including an electric motor having a speed responsive to frequency variations impressed on the motor to drive it; a source of electrical pulses, the repetition frequency or length of time between pulses of which is controllable; and an electrical gate connecting the electric motor and pulse source for controlled application of a selected quantity of pulses per unit of time to be applied to the motor.

The motor system as broadly defined above is characterized by a coordinated electronic-electromechanical system for controlling the speed of a selected induction machine in an efficient manner. The electric motor may be adapted for submerged operation by encapsulating the stator windings in a waterproof material. The source of electrical pulses and electrical gate may be compactly placed in the motor system either at the location of the motor itself or in a location apart from the motor. Furthermore, the system is designed to operate from readily available direct current voltage sources.

BRIEF DESCRIPTION OF THE DRAWINGS

The invention will now be described with particular reference to the accompanying drawings wherein:

FIG. 7 (7A and 7B) is a schematic of a preferred circuit for operating the motor illustrated in FIG. 1.

In the drawings, where applicable, like numerals of reference indicate similar or analogous parts in the several views.

FIG. 1 illustrates a preferred configuration for the electric motor of this invention, wherein an alternating current power motor 25 having an outer casing 1, is affixed to support shaft 5. Upper support shaft 5A is adapted to receive support shaft 5 is telescoping fashion, and the two are secured by adjustable shaft clamp 28. Motor 25 is fitted with propellor 4, screened water inlet and exit ports 2 fitted in end bells 26 and bumper cone 3. Mounting bracket 6 carrys the end of upper support shaft 5A and lower sleeve 7, in which upper support shaft 5A is positioned, as well as mounting clamp 27. Support 17 is also carried by mounting bracket 6 and lower sleeve 7, and serves to support gearbox 22. Steering motor 10 is carried by gearbox 22 and is mechanically connected to gears 23 (more fully illustrated in FIG. 5). Gearbox pulley 15 is also connected to gears 23, extends upwardly from the top of gearbox 22, and is connected by belt 16 to shaft pulley 14 mounted on upper support shaft 5A, so as to effect rotation of this shaft upon activation of steering motor 10. Follow-up rheostat 9 is mounted on gearbox 22 by means of bracket 19; rheostat 9 also carrys upper sleeve 24 and serves to position support shaft 5, upper support shaft 5A, and power motor 10, in cooperation with gears 8, one of which is mounted on follow-up rheostat 9, and the other on shaft pulley 14. Electrical signals are applied to steering motor 10 via wires 11, to power motor 25 through support shaft 5 upper support shaft 5A, and connecting tap 18 by wires 13, and to follow-up rheostat 9 through wires 12. This wiring is channeled through conduit 20 to the electronic circuit illustrated in FIGS. 7A and 7B and in turn, to foot control 35 illustrated in FIG. 4. A housing, 21, is provided to effect protection from the weather.

FIG. 2 illustrates the front end bell design of power motor 25, showing motor casing 1, front end bell 26, and screened inlet ports 2 for water ingress and egress.

FIG. 3 shows a cross sectional interior of power motor 25, more particularly illustrating casing 1, support shaft 5, encapsulated stator windings 40, rotor 41, shaft 43 and rotor holes 44.

FIG. 4 illustrates preferred foot control 35 of the invention, with cover 30, on-off switch 31, power motor forward-reverse switch 32, steering motor clockwise-counterclockwise rotation control 34 and speed control 36. Battery terminals 33 and 37 are connected to a source of direct current to drive power motor 25 and steering motor 10, shown in FIG. 1. Cover 30 may be adapted to house the electronic circuit illustrated in FIGS. 7A and 7B, although this circuit is preferably situated in a separate housing located elsewhere in the motor system. In a more preferred aspect of the invention, control 35 is designed to be completely operated by the foot, thus leaving the hands free.

FIG. 5 presents a more detailed illustration of grearbox 22, showing the relationship of steering motor 10 to gears 23, carried by gearbox 22, and connected to gearbox pulley 15. The connection between gearbox pulley 15 and shaft pulley 14 is effected by belt 16, and gears 8 facilitate connection between follow-up rheostat 9 and upper support shaft 5A. Bracket 19, carrying upper sleeve 24, serves to support follow-up rheostat 9, and, aided by mounting bracket 6 carrying lower sleeve 7, also supports upper support shaft 5A.

FIG. 6 is in the form of a block diagram illustrating preferred control components of the invention; cycloinverter circuit 51, designed to achieve speed control of power motor 25, illustrated in FIG. 1 and steering circuit 52 for maintaining a desired heading of power motor 25 through the action of steering motor 10. Direct current voltage source 50 is utilized to initiate action in cycloinverter circuit 51.

Figure 7A:
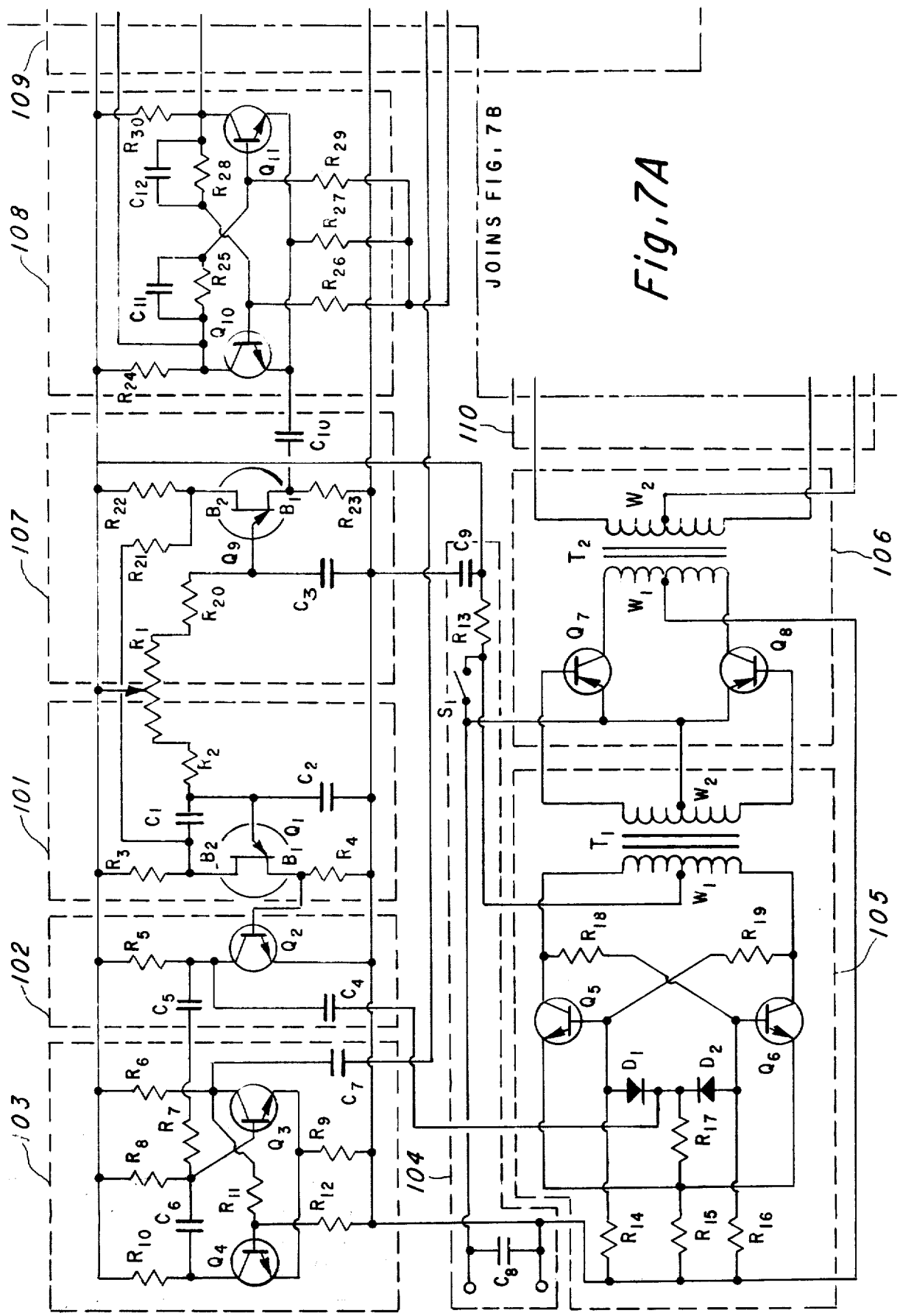
FIGS. 7A and 7B of the drawing illustrate a more preferred cycloinverter, steering motor and power motor circuitry for operating electric power motor 25, and have been segmented into eleven component circuits to facilitate clarity. These component circuits are numbered from 101 to 111, respectively: the inverter trigger 101; driver amplifier 102; monostable synchronizer 103; power supply filter 104; power inverter drive 105; power inverter 106; gate enabling trigger 107; gate enabling flip-flop 108; SCR gate and output 109; steering motor 110; and power motor circuit 111.
Figure 7B:
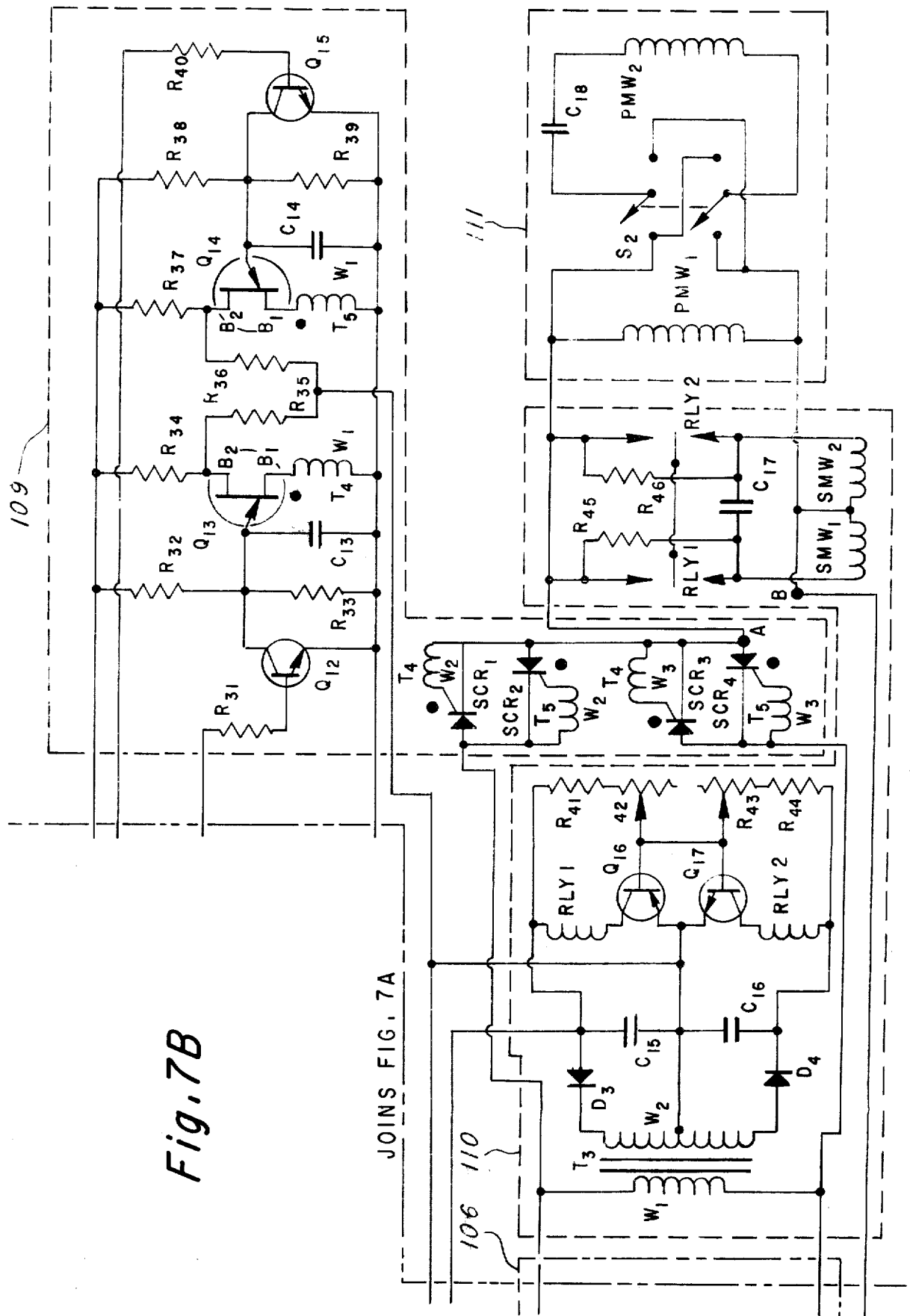

Referring in detail to FIGS. 7A and 7B, it will be appreciated that the cycloinverter circuit itself is represented by the inverter trigger 101, driver amplifier 102, monostable synchronizer 103, power inverter drive 105, power inverter 106, gate enabling trigger 107, gate enabling flip-flop 108, in combination with the SCR gate and output circuit 109. Steering is effected by activation of the steering motor circuit 110, while power is supplied directly to the power motor windings by application of power motor circuit 111.

The inverter trigger 101 is included in the cycloinverter to generate positive voltage pulses (with respect to ground) having controllable and adjustable frequency, in order to initiate action in other component parts of the cycloinverter circuit. The inverter trigger also serves to generate negative voltage pulses (with respect to ground), thereby synchronizing the gate enabling trigger circuit 107.

The inverter trigger is composed of variable resistor $R_1$ in electrical connection with resistor $R_2$, capacitor $C_1$, and resistor $R_3$. Base $B_1$ of unijunction transistor $Q_1$ is in turn connected in series with resistor $R_4$, and Base $B_2$, to $R_3$. The emitter of $Q_1$ is connected to capacitor $C_2$ and $R_2$. Both $R_1$ and $R_3$ are in communication with filtered voltage supply illustrated by block 50 in FIG. 6 while $R_4$ and $C_2$ are connected to ground.

The drive amplifier 102 is utilized in the invention to amplify the voltage and power of pulses generated across resistor $R_4$ by the inverter trigger 101, and to simultaneously produce a negative pulse output to activate the power inverter drive 105 and the monostable synchronizer 103.

Components of the drive amplifier 102 include resistor $R_5$ in connection with capacitor $C_3$. The collector of NPN transistor $Q_2$ is in turn in connection with capacitor $C_4$, and the base of this transistor is in communication with Base $B_1$ of unijunction transistor $Q_1$ located in the inverter trigger 101. $R_5$ is connected to filtered voltage supply 50, shown in FIG. 6, and the emitter of $Q_2$, to ground.

The monostable synchronizer 103 functions to delay incoming negative pulses from the driver amplifier 102 through blocking capacitor $C_5$ located in that circuit, in order to synchronize the SCR (silicon controlled rectifier) gate and output 109 gating function. This synchronizing action insures proper SCR rectifier operation and is made necessary by the inductive nature of the power motor load connected to the cycloinverter circuit.

Figure 6:
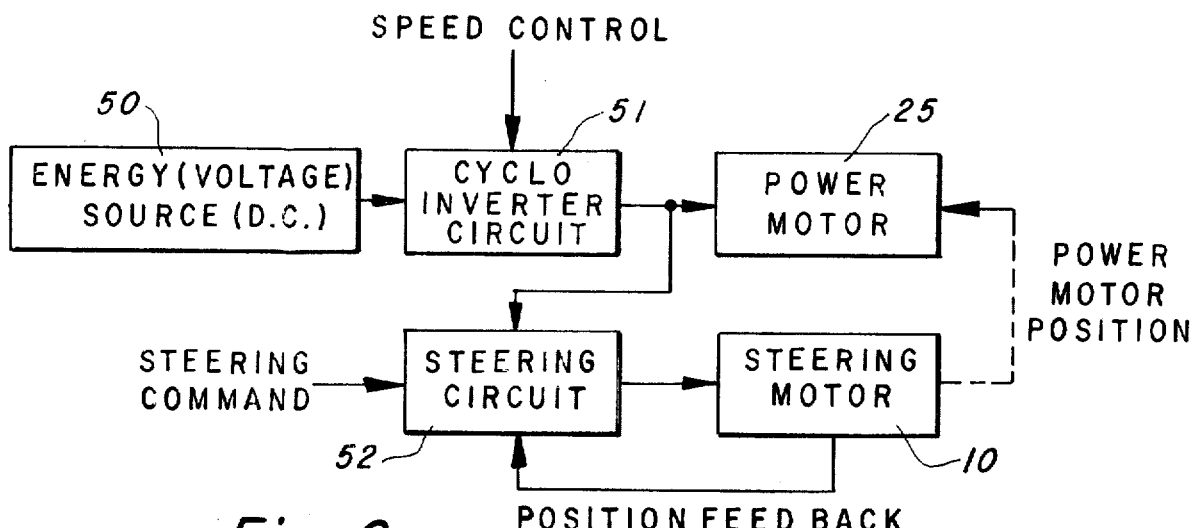
FIG. 6 is a block diagram of a set of preferred operating components of the electric motor shown in FIG. 1.

Included in the monostable synchronizer components are resistor $R_6$, connected both to filtered voltage supply 50, shown in FIG. 6, and the collector of NPN transistor $Q_3$. Resistors $R_8$ and $R_{10}$ are likewise in connection with the base of $Q_3$ and the collector of transistor $Q_4$, respectively as well as filtered voltage source 50, illustrated in FIG. 6. Resistor $R_7$ is in communication with capacitor $C_6$, the base of $Q_3$ is in communication with the connector of $C_6$ and $R_7$, and the emitter of that transistor is connected to the emitter of NPN transistor $Q_4$. The base of $Q_4$ is in direct communication with resistor $R_{11}$, and the collector of $Q_3$, which collector is in turn attached to capacitor $C_7$. The collector of $Q_4$ is further directly in communication with $R_{10}$. The common emitter connector of $Q_3$ and $Q_4$ is in connection with resistor $R_9$ which is in turn connected to resistor $R_{12}$, and $R_9$ and $R_{12}$ are both connected to ground.

The power supply filter 104 functions to apply and maintain a substantially constant voltage supply to all circuits in the cycloinverter system requiring direct current power from the primary energy source.

Circuit components of the power supply filter are capacitor $C_8$ in connection with switch $S_1$, resistor $R_{13}$ and capacitor $C_9$. A suitable supply voltage is impressed across $C_8$ and $C_9$ is connected to ground.

The purpose of the power inverter drive 105, is to provide a variable frequency square wave base current to drive the power transistors located in the power inverter 106.

Circuit components of the power inverter drive include resistor $R_{14}$ connected from ground to the anode of diode $D_1$ and the base of NPN transistor $Q_5$. Resistor $R_{16}$ is in turn connected from ground to the anode of diode $D_2$ and the base of NPN transistor $Q_6$, $R_{14}$ and $R_{16}$ being connected to ground. Resistors $R_{15}$ and $R_{17}$ are in direct communication and the common connector thereof is connected to the emitters of transistors $Q_5$ and $Q_6$. The collector of $Q_5$ is in communication with resistor $R_{18}$ and the base of $Q_6$. Likewise the collector of $Q_6$ is connected to resistor $R_{19}$ and to the base of $Q_5$. The collectors of $Q_5$ and $Q_6$ are also in connection with winding $W_1$ of transformer $T_1$. The center tap of $W_1$ is in communication with the power supply filter 104, via switch $S_1$, located in that circuit and winding $W_2$ of $T_1$ is further in inductive communication with $W_1$.

The function of the power inverter 106 is to convert a low voltage, direct current to a higher voltage, alternating current output at a relatively high power level.

The power inverter is characterized by two PNP transistors $Q_7$ and $Q_8$, the emitters of which are connected, this connector being also in communication with the center tap of window $W_2$ in transformer $T_1$ located in the power inverter drive 105, as well as capacitor $C_8$, in the power supply filter 104. The base of both $Q_7$ and $Q_8$ are in turn connected to $W_2$ and the collectors of these transistors are attached to winding $W_1$ of transformer $T_2$. Winding $W_2$ of $T_2$ is in inductive communication with $W_1$.

The gate enabling trigger 107 is contiguous to the inverter trigger circuit 101, and operates to supply synchronized positive voltage pulses to the gate enabling flip-flop circuit 108 to establish an adjustable cycloinverter output frequency.

Included in the gate enabling trigger are a portion of variable resistor $R_1$ in connection with resistor $R_{20}$, capacitor $C_3$, and the emitter of unijunction transistor $Q_9$. Resistors $R_{21}$ and $R_{22}$ are in connection with each other, and are in turn, in common communication with base $B_2$ of $Q_9$. Base $B_1$ of $Q_9$ is in connection with resistor $R_{23}$ and capacitor $C_{10}$. $R_{22}$, like $R_{21}$, is connected to filtered voltage source 50, in FIG. 6, while $C_3$ and $R_{23}$ are connected to ground.

The gate enabling flip-flop 108 is included in the invention circuitry to generate voltage square waves which can be frequency controlled, and are both positive and negative with respect to ground. This voltage is used to control the SCR gate and output 109 and permit firing of the silicon controlled rectifier gates in the proper sequence and time interval.

Circuit components included in the gate enabling flip-flop are NPN transistors $Q_{10}$ and $Q_{11}$, both having a common emitter connector. The base of $Q_{10}$ is in turn connected to a capacitor, $C_{12}$ resistor, $R_{28}$, parallel combination, which combination is in turn attached to resistor $R_{30}$. The Base of $Q_{11}$ is in turn attached to a similar parallel combination with capacitor $C_{11}$ and resistor $R_{25}$ included therein, and this combination is connected to resistor $R_{24}$. The base of $Q_{10}$ is also in communication with resistor $R_{26}$, the base of $Q_{11}$ is in similar communication with resistor $R_{29}$, and the common connector between the emitters of $Q_{10}$ and $Q_{11}$ is in further communication with resistor $R_{27}$. $R_{24}$ and $R_{30}$ are in connection with filtered voltage supply 50, illustrated in FIG. 6, while $R_{26}$, $R_{27}$, and $R_{29}$ are in connection with capacitor $C_{15}$ in steering motor circuit 110.

The SCR gate and output circuit 109 functions to alternately supply positive gate-cathode voltages to the silicon controlled rectifiers in a preselected, properly spaced and timed sequence to establish the output of the cycloinverter circuit at a desired voltage and frequency.

The SCR gate and output circuit is characterized by two NPN transistors, $Q_{12}$ and $Q_{15}$, having a common emitter connector to ground. The base of $Q_{12}$ is connected in series with resistor $R_{31}$, and this connector is in further communication with the collector of NPN transistor $Q_{11}$ in the gate enabling flip-flop 108. Likewise, the base of $Q_{15}$ is connected in series with resistor $R_{40}$ and the collector of PNP transistor $Q_{10}$, also in the gate enabling flip-flop. The collector of $Q_{12}$ is in electrical communication with the emitter of unijunction transistor $Q_{13}$, and the collector of $Q_{15}$ is likewise in contact with the emitter of unijunction transistor $Q_{14}$. The base of $B_1$ of $Q_{13}$ is connected to winding $W_1$ of transformer $T_4$. $W_1$ is in turn inductively connected to the gate of silicon controlled rectifiers $SCR_1$ and $SCR_3$. Similarly, the base of $B_1$ of $Q_{14}$ is connected to winding $W_1$ of transformer $T_5$, and the gate of silicon controlled rectifiers $SCR_2$ and $SCR_4$ are in inductive communication with $W_1$ of $T_5$. Base $B_2$ of $Q_{13}$ is connected to resistor $R_{35}$, and in like manner, base $B_2$ of $Q_{14}$ is connected to resistor $R_{36}$. $R_{35}$ and $R_{36}$ being joined by a common connector to capacitor $C_7$ in the monostable synchronizer 103.

Resistors $R_{32}$ and $R_{33}$ are in connection, as are resistors $R_{38}$ and $R_{39}$, both sets of resistors being connected to filtered voltage supply 50, shown in FIG. 6 and to ground; each respective set further having a connector thereof in communication with the collectors of $Q_{12}$ and $Q_{15}$, respectively. Similarly, resistor $R_{34}$ is in attachment to $R_{35}$, and resistor $R_{37}$ is connected to $R_{36}$, both $R_{34}$ and $R_{37}$ being also connected to filtered voltage supply 50, illustrated in FIG. 6. Capacitor $C_{13}$ is in parallel connection with $R_{33}$, and is also connected to the emitter of $Q_{13}$ and to ground. In like manner, capacitor $C_{14}$ is in parallel connection with $R_{39}$ and connects with the emitter of $Q_{14}$ and ground. Wingings $W_2$ and $W_3$ in $T_4$ are in electrical inductive communication with $W_1$ of $T_4$ associated with silicon controlled rectifiers $SCR_1$ and $SCR_3$, while windings $W_2$ and $W_3$ in $T_5$ are in electrical inductive communication with $W_1$ of $T_5$ associated with silicon controlled rectifiers $SCR_2$ and $SCR_4$.

While the steering motor circuit 110 is not directly a part of the cycloinverter circuit, it cooperates with this circuit to detect directional changes in the heading of the power motor and to effect a desired change in this heading. In a most preferred embodiment of the invention, this result is achieved through application of a novel maximum effort positional control system.

Figure 1:
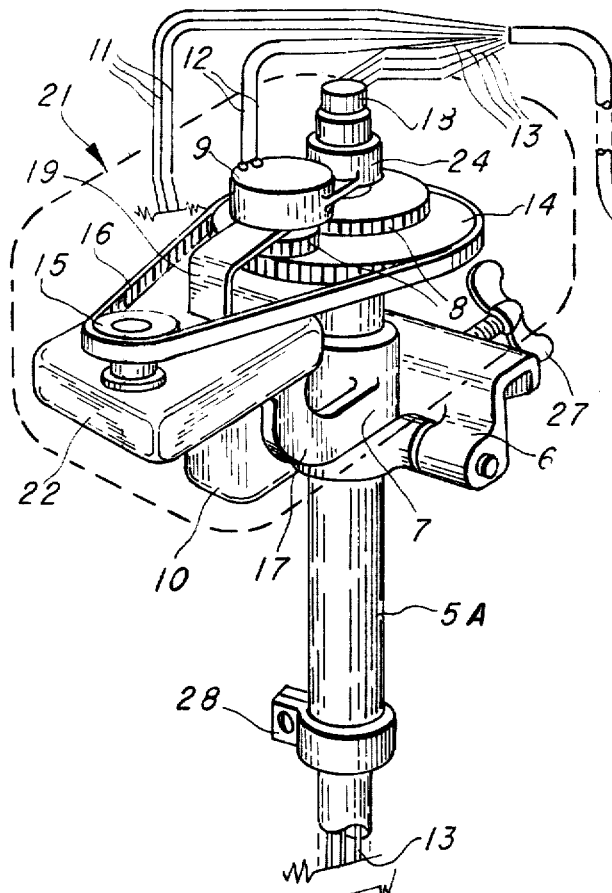
FIG. 1 is a perspective view of the electric motor in accordance with a preferred embodiment of the invention.

Circuit components in the steering motor circuit include transformer $T_3$ equipped with windings $W_1$ and $W_2$, $W_2$ being connected to the cathode of diode $D_3$, and to the anode of diode $D_4$. Capacitors $C_{15}$ and $C_{16}$ are attached to a connector common to the anode of $D_3$ and the cathode of $D_4$, respectively. Also in connection with the anode of $D_3$ are resistor $R_{41}$ and variable resistor $R_{42}$; similarly, variable resistor $R_{43}$ and resistor $R_{44}$ are in communication with the cathode of $D_4$. Further in contact with the anode of $D_3$ is relay Rly 1, which relay is in turn connected to the collector of PNP transistor $Q_{16}$. Winding $SMW_1$ of steering motor 10, illustrated in FIG. 1, is also connected to Rly 1 and resistor $R_{45}$. In like manner, relay Rly 2 is in communication with the cathode of $D_4$, resistor $R_{46}$, winding $SMW_2$ of steering motor 10, and the collector of NPN transistor $Q_{17}$. Capacitor $C_{17}$ is also connected to Rly 1 and Rly 2, and the emitters of $Q_{16}$ and $Q_{17}$ are in direct communication with each other. The center tap of $W_2$ is also connected to the emitters of $Q_{16}$ and $Q_{17}$, while the base of $Q_{16}$ is connected to the wiper arm of $R_{42}$, and the base of $Q_{17}$ is in contact with the wiper arm of $R_{43}$. The wiper arms of $R_{42}$ and $R_{43}$ are also in common communication, and the connector between $C_{15}$ and $C_{16}$ is in contact with the base of NPN transistor $Q_{10}$ through resistor $R_{26}$ in the gate enabling flip-flop 108. In addition, transformer $T_3$ is in electrical contact with transformer $T_2$ located in the power inverter 106.

Like the steering motor circuit 110, the power motor circuit 111 is not a part of the basic cycloinverter circuit, but is the recipient of the cycloinverter circuit controlled output. The purpose of this circuit is to apply power to the windings of power motor 25, shown in FIG. 1, and to provide reversing characteristics for that motor.

The components of the power motor circuit 111 are power motor windings $PMW_1$ and $PMW_2$, both of which are in communication with switch $S_2$, and capacitor $C_{18}$, which is connected to $PMW_2$.

It is apparent from a consideration of the foregoing that the rotors (not illustrated) of power motor 25 and steering motor 10 illustrated in FIG. 1, are in inductive communication with power motor windings $PMW_1$ and $PMW_2$, and steering motor windings $SMW_1$ and $SMW_2$, respectively.

The inherent increasing load current difficulty present when a voltage (cycloinverter output) is impressed across an inductive load (power motor 25) with no direct voltage control, is managed in the circuitry by providing for an increased power inverter frequency as the cycloinverter frequency is reduced. Such action provides a more limited period in which the power inverter can provide current to the inductive load, (power motor 25) and thereby restricts the current from rising to excessively large values in the power motor windings.

Figure 4:
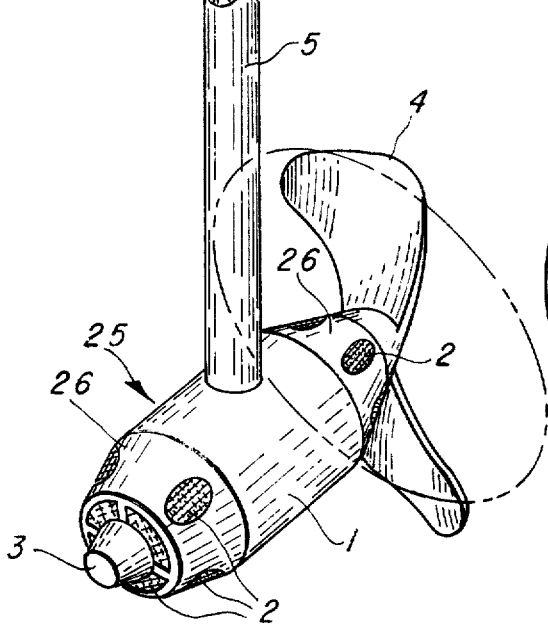
FIG. 4 is a perspective view of the remote control unit for the electric motor in FIG. 1.
Figure 4:
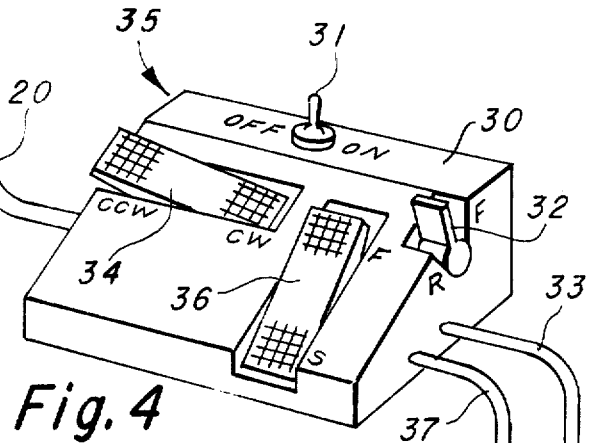
Figure 2:
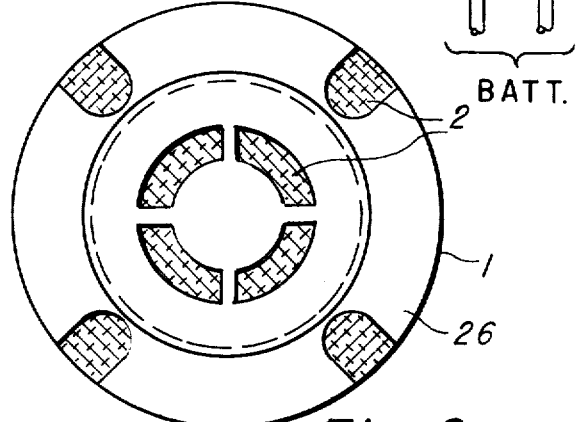
FIG. 2 is a front elevation of the power motor unit of the electric motor shown in FIG. 1.

Activation of the entire cycloinverter circuit illustrated in FIGS. 7A and 7B of the drawing is triggered by signals initiated in foot control 35 illustrated in FIG. 4. When switch 31 is turned on and control 34 manipulated by the operator, capacitor $C_2$ begins charging through resistors $R_1$ and $R_2$ in the inverter trigger 101. This charging is effected by application of filtered voltage supply 50, illustrated in FIG. 6. The charging of $C_2$ activates unijunction transistor $Q_1$, thus providing electrical conduction through the emitter of that transistor to base $B_1$. This conduction causes a positive electrical pulse to be generated across resistor $R_4$ and a negative pulse to appear at the base $B_2$ of $Q_1$. The pulse width, or repetition frequency of this pulse is controlled by the size of $C_2$, $R_4$, and the grounded input resistance of NPN transistor $Q_2$. Capacitor $C_1$ provides built-in protection against premature emitter-base $B_1$ conduction in $Q_1$ as a result of power supply transients. Resistor $R_3$ is selected to compensate for variations in the peak point emitter voltage at which emitter-base $B_1$ conduction begins in $Q_1$, as a result of changes in ambient temperature.

It will be appreciated that the term "pulse" as used in this application, signifys a substantially uniform positive or negative voltage and not a series of random electrical blips sometimes called pulses by those skilled in the art.

Conduction through the emitter-base $B_1$ path in $Q_1$ discharges capacitor $C_2$ to a lower voltage level, thus effecting a voltage drop at the emitter of $Q_1$. This change in voltage results in a termination in conduction from emitter to base $B_1$ in $Q_1$, and $C_2$ again begins to charge, thus beginning another pulse generation cycle in the inverter trigger.

Incoming positive pulses generated in inverter trigger 101 are impressed from the base $B_1$ of $Q_1$ on the base of NPN transistor $Q_2$ located in the driver amplifier circuit 102. This pulsation at the base of $Q_2$ causes this transistor to conduct sharply, thereby reducing the collector voltage of $Q_2$ and causing negative electrical pulses to be generated through blocking capacitor $C_4$ to the power inverter drive 105 and through capacitor $C_5$ to the monostable synchronizer 103.

Referring to the monostable synchronizer 103, the normal operating condition for this circuit when no input trigger pulse is forthcoming, but when off-on switch 31, in foot control 35, FIG. 4, is in the "on" position, is conduction of NPN transistor $Q_3$ and nonconduction of NPN transistor $Q_4$. Base current is supplied to $Q_3$ via resistor $R_8$ from filtered voltage supply 50, illustrated in FIG. 6. Since $Q_3$ is in a highly saturated state under these conditions the collector-emitter voltage thereof is at saturation, and is therefore very small. The voltage from the common emitters of $Q_3$ and $Q_4$ is that which is impressed across resistor $R_9$, which is essentially the voltage existing at the collector of $Q_3$. Resistors $R_{11}$ and $R_{12}$ form a voltage divider, operating to place only a portion of the voltage existing at the collector of $Q_3$ on the base of $Q_4$. Since the collector voltage of $Q_3$ and the emitter voltage of $Q_4$ are essentially the same the base of $Q_4$ is at a lower voltage than the emitter of $Q_4$. This electrical condition provides a back bias to restrain $Q_4$ from conducting. Since there is no current flowing in resistor $R_{10}$, the voltage across capacitor $C_6$ becomes the supply voltage 50 shown in FIG. 6, minus the sum of the base-emitter voltage across $Q_3$ and the voltage across resistor $R_9$.

Resistor $R_7$ is a current limiting resistor through which negative pulses from the driver amplifier 102 are applied to the base of $Q_3$. When applied, these pulses are of sufficient strength to momentarily back bias $Q_3$ and place it in a non-conducting state from its normally conducting condition. When this occurs, the collector voltage of $Q_3$ rises resulting in a larger voltage applied to the voltage divider combination $R_{11}$ and $R_{12}$ than previously when $Q_3$ was conducting. This electrical condition operates to make the base of $Q_4$ positive with respect to the emitter of that transistor, thereby causing $Q_4$ to conduct in a saturated state. Under these conditions, the end of capacitor $C_6$ which is connected to the collector of $Q_4$ is positive, and is connected through the collector-emitter path of $Q_4$ to the emitter of $Q_3$. The negative end of $C_6$ is in turn connected to the base of $Q_3$. Thus, the voltage across $C_6$ effects a back bias condition in $Q_3$, and operates to lengthen the nonconducting period of $Q_3$. Eventually, (depending upon the charging time of $C_6$ through $R_8$), the voltage across $C_6$ drops from a formerly high value to a lower value and finally to a point where $Q_3$ again begins to conduct, thereby returning the monostable synchronizer 103 to its original state between pulses.

With regard to the monostable synchronizer 103, it is significant that at the onset of a trigger pulse from the driver amplifier 102, the collector of $Q_3$ rises in voltage, and as the circuit returns to its stable state this collector voltage drops. This change is approximately differentiated by the small blocking capacitor $C_7$, in combination with the resistive load connected to $C_7$. The initial rise in the collector voltage of $Q_3$ produces a positive voltage pulse to the load, power motor 25, while the delayed return of the $Q_3$ collector voltage to a relatively low value effects a desired, delayed negative pulse to the SCR gate and output 109 for synchronizing purposes.

In the power supply filter 104 capacitor $C_8$ operates to maintain a path of low impedance to sudden changes in the supply voltage from source 50, in FIG. 6. This capacitor thereby insures that the alternating current impedance as well as the transient impedance of source 50, is maintained at a desired low level. Switch $S_1$ (corresponding to control switch 31 in FIG. 4) applies voltage from voltage source 50 to the resistor $R_{13}$ and capacitor $C_9$ filter combination. This condition permits power supply voltage variations to drop across $R_{13}$ with low impedance to such changes at $C_9$. Since very little voltage variation is observed across $C_9$, the filtered voltage on the side of $C_9$ opposite the supply voltage source is applied to desired points in the electronic circuitry of this invention.

Closure of switch $S_1$ in the power supply filter 104, applies a lightly filtered primary power supply voltage from source 50 (illustrated in FIG. 6) to the power inverter drive 105, which operates very similarly to the monostable synchronizer 103. Initially, one of the NPN transistors $Q_5$ or $Q_6$ is conducting between pulses, while the other is not conducting. Assuming that $Q_6$ is conducting after closure of switch $S_1$, but before a pulse is introduced into the circuit, the emitters of $Q_5$ and $Q_6$ are common, and the voltage from these emitters to ground is equal to the voltage across resistor $R_{15}$. Since $Q_5$ is not conducting under these conditions, the collector voltage of that transistor is relatively high. Current flows through resistor $R_{18}$ to the base of $Q_6$, thereby keeping $Q_6$ well into the saturated state. Therefore, except for the small collector-emitter saturation voltage of $Q_6$, the voltage applied to the voltage divider combination, resistors $R_{19}$ and $R_{14}$, is the same as the emitter voltage of these transistors. Thus, only a portion of this voltage appears at the base of $Q_5$, which base is lower in voltage than the emitter of $Q_5$, thereby effecting a back bias condition of that transistor. Diodes $D_1$ and $D_2$, in connection with resistor $R_{17}$, comprise the trigger pulse steering circuit. Under conditions where $Q_6$ is conducting and no pulse is received in the power inverter drive 105, the anode of $D_1$ is negative with respect to the cathode of that diode. The point in the circuit at which $D_1$, $D_2$, and $R_{17}$ join, is at a potential very nearly that of the emitters of $Q_5$ and $Q_6$. Thus, the cathode voltage of $D_1$ is approximately the same as the emitter voltage of $Q_6$ while the anode of that diode is at the same voltage as the base of $Q_6$. This electrical arrangement results in the base of $Q_6$ being negative with respect to the emitter of that transistor, and accounts for the non-conducting state of $D_1$. $D_2$ is connected from the base of $Q_6$, through $R_{17}$ to the emitter thereof, thus effecting a relatively small forward voltage on $D_2$, which holds it near the conducting state.

The arrival of a negative electrical pulse from the driver amplifier 102 via blocking capacitor $C_1$, causes the cathode of $D_2$ to become more negative with respect to the anode than it was before the pulse arrived. This condition effects conduction in $D_2$, thereby lessening the base current to $Q_6$. Arrival of this negative pulse thus initiates a regenerative circuit operation whereby the collector of $Q_6$ rises in potential, thereby causing $Q_5$ to begin conducting. This condition in turn reduces the base current in $Q_6$, and causes that transistor to become entirely non-conducting, while $Q_5$ conducts in a saturated state.

As $Q_5$ begins conducting, current begins to flow in the collector of that transistor and also in the upper half of winding $W_1$ in transformer $T_1$, thereby reversing the polarity of the voltage previously generated in winding $W_2$ of $T_1$. At this stage of operation, the power inverter drive 105 is now in a state similar to the initial condition where $Q_6$ was conducting between pulses, except that the roles of $Q_5$, $Q_6$, $D_1$ and $D_2$ are reversed.

The next trigger pulse from the driver amplifier 102 causes the power inverter drive 105 to return to its initial state. This continued reversal of current through winding $W_1$ of $T_1$ induces an alternating voltage square wave onto the winding $W_2$ of $T_1$. The frequency of this wave form is determined by the pulse rate (two pulses per cycle preferably) which is generated in the inverter trigger 101, and is transmitted to the power inverter 105 via driver amplifier 102.

Induction of a drive voltage into secondary winding $W_2$ of transformer $T_1$ as a result of pulsation in the power inverter drive 105 causes current to flow alternately from emitter to base in PNP transistors $Q_7$ and $Q_8$, respectively, located in the power inverter 106. (When no electrical pulses are received in the power inverter drive 105, no conduction takes place in either $Q_7$ or $Q_8$.) Alternate current flow in the emitter-base path of $Q_7$ and $Q_8$ produces a corresponding alternate current in the respective collectors of $Q_7$ and $Q_8$. This current flows through winding $W_1$ of transformer $T_2$, and, responsive to the turns ratio in $T_2$, produces a larger, alternating output voltage on winding $W_2$ of $T_2$ than that present in $W_1$, which output is impressed via the SCR gate and output 109 on the windings of power motor 25 illustrated in FIG. 1. Transistors $Q_7$ and $Q_8$ are preferably high power devices having on the order of 170 watts collector dissipation at 25°C, and peak collector currents of 30 amperes. $T_2$ is designed to handle high power levels, and is center tapped on both the primary ($W_1$) and secondary ($W_2$) windings. The available output power of $W_2$ of $T_2$ is therefore quite large when compared to power levels in other portions of the cycloinverter circuit.

It should be noted that power is applied to the power inverter 106 at all times from primary energy source 50, shown in FIG. 6, during operation of the electric motor system. The circuit design eliminates the need for an on-off switch capable of switching relatively large direct currents present in the circuit. Instead of removing power from power inverter 106, power is removed from power inverter drive 105, thus effectively turning $Q_7$ and $Q_8$ off simultaneously. Switching is therefore accomplished by causing the transistors in the power inverter drive 105 and power inverter 106 to be activated and inactivated at will by controlling pulses originating in the inverter trigger 101 and applied to the power inverter drive 105.

Operation of the gate enabling trigger 107 is very similar to that of the inverter trigger 101, except that the trigger pulse rate or frequency in the former is much slower. Capacitor $C_3$ charges through a portion of variable resistor $R_1$ in series with resistor $R_{20}$ from filtered voltage supply 50 shown in FIG. 6. $C_3$ charges to a predetermined voltage, thereby activating unijunction transistor $Q_9$ and effecting conduction through the emitter-base $B_1$ path, which action causes a discharge of $C_3$. This action produces a positive pulse across resistor $R_{23}$, which is transmitted via blocking capacitor $C_{10}$ to the gate enabling flip-flop 108. The pulse width is controlled by the size of $C_{10}$, $R_{23}$ and the trigger input impedence to the gate enabling flip-flop 108. The discharge of $C_3$ through the emitter-base $B_1$ junction of $Q_9$ causes the voltage across $C_3$ to drop significantly during the pulsing action of this circuit, thereby causing a conduction cessation in the emitter-base $B_1$ junction state in $Q_9$. $C_3$ then begins to charge again toward the ultimate emission of another pulse and a repeat of the circuit function.

It should be noted that resistor $R_{22}$ has been selected to compensate for peak point emitter (point at which emitter-base $B_1$ conduction begins) voltage variation as a result of temperature varation. Furthermore, resistor $R_{21}$ is a current limiting resistor through which negative voltage pulses from the inverter trigger 101, appear at the base $B_2$ of $Q_9$. Momentary reduction of the voltage on $B_2$ will cause $Q_9$ to pulse in synchronization with the inverter trigger 101 involving $Q_1$, if the emitter voltage of $Q_9$ is near the predetermined activating voltage.

As in the monostable synchronizer 103, and power inverter drive 105, the gate enabling flip-flop 108 utilizes transistors which alternately conduct and nonconduct according to a predetermined sequence. For purposes of illustration, it will be assumed that NPN transistor $Q_{11}$ is conducting, while NPN transistor $Q_{12}$ is not conducting, when switch 31 in FIG. 4 is in the on position, and no electrical pulse has yet arrived in the circuit. Transistors $Q_{10}$ and $Q_{11}$ have a common emitter connection and therefore, a common emitter voltage which is negative with respect to ground, since the lower connectors of resistors $R_{26}$, $R_{27}$ and $R_{29}$ are connected to the negative voltage supply portion of the steering motor circuit 110.

Under the conditions specified above, $Q_{11}$ is in saturation and the saturation voltage across that transistor is therefore quite small. The collector voltage of $Q_{11}$ is therefore essentially at the same level as that of the emitter, and is negative with respect to ground, as above noted. The voltage dividing action of resistors $R_{28}$ and $R_{26}$ operates to apply a portion of the $Q_{11}$ collector voltage to the base of $Q_{10}$. This condition results in a lower voltage applied to the base of $Q_{10}$ than is present at the emitter of that transistor, and this ensures that $Q_{10}$ will remain non-conducting.

The arrival of a positive pulse from the gate enabling trigger 107 via blocking capacitor $C_{10}$ located in that circuit causes an increase in the emitter voltage of both $Q_{10}$ and $Q_{11}$. The emitter of $Q_{11}$ thus becomes more positive than the base of that transistor, and $Q_{11}$ ceases to conduct. This condition in turn raises the voltage level of the collector of $Q_{11}$, and a positive base-emitter voltage is impressed on $Q_{10}$, thereby causing a base current to flow in that transistor with subsequent saturation of $Q_{10}$. Under these circumstances, the collector voltage on $Q_{10}$ drops, and the voltage divider action of $R_{25}$ and $R_{29}$ operates to place the base of $Q_{11}$ at a voltage level less than the emitter, thereby maintaining $Q_{11}$ in the nonconducting state. No further changes will occur in the gate enabling flip-flop 108 until the arrival of another pulse from the gate enabling trigger 107, at which time the former circuit will return to its original state.

Capacitors $C_{11}$ and $C_{12}$ in the gate enabling flip-flop 108, are known as speed-up capacitors, since during the circuit transition, these capacitors offer low impedance to current reaching the base of the particular transistor undergoing transition from the nonconducting to the conducting state, thereby speeding the saturation effect. It will be noted that the outputs of the gate enabling flip-flop 108 are effected at the collectors of $Q_{10}$ and $Q_{11}$.

It will be appreciated that the SCR gate and output 109 is essentially composed of two symmetrical halves. NPN transistors $Q_{12}$ and $Q_{13}$ perform the function of supplying positive gate-cathode pulses to silicon controlled rectifiers $SCR_1$ and $SCR_3$ in one half of the SCR gate and output circuit, while transistors $Q_{14}$ and $Q_{15}$ perform a like function with respect to $SCR_2$ and $SCR_4$ in the other half of the circuit. When a negative voltage (with respect to ground) is impressed on the base of $Q_{12}$ as a result of the conduction of $Q_{11}$ in the gate enabling flip-flop 108, this transistor is prevented from conducting. Capacitor $C_{13}$ then charges through resistor $R_{32}$ by application of filtered voltage supply 50 illustrated in FIG. 6. Resistor $R_{31}$ is chosen so as to limit the voltage across capacitor $C_{13}$ to a value slightly less than that required to activate conduction from the emitter to the base of unijunction transistor $Q_{13}$. This result is achieved by application of the voltage dividing action presented by $R_{32}$ and $R_{33}$. In addition, $R_{32}$ and $C_{13}$ are chosen such that the charging time of $C_{13}$ is relatively short. Application of filtered voltage supply 50 in FIG. 6 to the circuit under these conditions places the first half of the circuit discussed above in a poised condition ready to pulse the $SCR_1$ and $SCR_3$ gates upon application of an independent, negative synchronizing pulse signal from monostable synchronizer 103, to base $B_2$ of $Q_{13}$ via $R_{35}$. When this negative signal is applied to the first half of circuit through current limiting resistor $R_{35}$ to base $B_2$ of $Q_{13}$, a momentary reduction in the base voltage occurs, which condition in turn causes $Q_{13}$ to conduct from emitter to base $B_1$, and through winding $W_1$ of transformer $T_4$. The pulse thereby induces current to flow through secondary windings $W_2$ and $W_3$ of $T_4$, to silicon controlled rectifiers $SCR_1$ and $SCR_2$. The induced pulsation to $SCR_1$ and $SCR_2$ establishes a controlled cycloinverter output frequency and voltage for a half cycle operation of the SCR gate and output circuit 109. After the discharge of $C_{13}$ to a relatively low voltage level, conduction of $Q_{13}$ is terminated.

It is significant that while a negative voltage is impressed on the base of transistor $Q_{12}$, a positive voltage is applied to the base of transistor $Q_{15}$ through resistor $R_{40}$ in the second half of the SCR gate and output 109. This voltage effects a current in the base-emitter path of $Q_{15}$ sufficiently large to saturate the transistor. Since the voltage drop across $Q_{15}$ is therefore quite small, the voltage impressed on the emitter of transistor $Q_{14}$ is substantially zero, and incoming negative pulses from the monostable synchronizer 103 will not effect base $B_1$-emitter conduction in $Q_{14}$. This condition of $Q_{14}$ prevents undesirable gate-cathode pulsing with accompanying conduction of $SCR_2$ and $SCR_4$ in the second half of the SCR gate and output 109. $SCR_2$ and $SCR_4$ are therefore maintained in a blocking state regardless of the anode-cathode voltage polarity, while $SCR_1$ and $SCR_3$ are conducting. (A like blocking state of the first half of the SCR gate and output circuit with $SCR_1$ and $SCR_3$ occurs when a negative voltage is impressed on the base of $Q_{15}$, causing a nonconducting state of that transistor.)

This nonconducting state of the second half of the SCR gate and output 109 causes capacitor $C_{14}$ to charge through resistor $R_{38}$ to a voltage level slightly less than that required to activate unijunction transistor $Q_{14}$ base-emitter conduction. Application of a synchronizing negative voltage pulse to base $B_2$ and $Q_{14}$ through resistor $R_{36}$ from the monostable flip-flop 103 effects conduction in $Q_{14}$, which in turn causes conduction in $SCR_2$ and $SCR_4$ through pulsation in transformer windings $T_5$. This operation of the second half of the SCR gate and output 109 is identical to the operation of the first half of that circuit when $Q_{13}$ is activated.

It will be appreciated that resistors $R_{34}$ and $R_{37}$ located in the first and second half of the SCR gate and output 109 respectively, are chosen to compensate for ambient temperature variation in the operation of transistors $Q_{13}$ and $Q_{14}$.

It should also be noted that the frequency of the gate enabling flip-flop 108, output is lower than that of the power inverter 105. Thus, the gate trigger circuit of a given set of silicon controlled rectifiers will be enabled or permitted to fire, for several half cycles of the power inverter 106 output. The power inverter 106 output is connected to the anodes of silicon controlled rectifiers $SCR_1$ and $SCR_4$. At each half cycle of the power inverter 106 output, a gate trigger pulse is applied to alternative sets of the silicon controlled rectifiers $SCR_1$–$SCR_3$, and $SCR_2$–$SCR_4$. One rectifier of each set is characterized by a positive anode with respect to cathode to a given point in the output cycle. Trigger pulses received in the SCR gate and output 109 and transmitted to the respective $SCR_1$–$SCR_3$ and $SCR_2$–$SCR_4$ gates, thus cause the respective silicon controlled rectifiers to turn on when the particular pulse corresponds to the positive anode with respect to cathode condition. When one of the $SCR_1$–$SCR_3$ set is conducting responsive to $Q_{11}$ conduction in gate enabling flip-flop 108, point A located in the SCR gate and output 109 is made positive with respect to point B, located in the steering motor circuit 110. (The cycloinverter output is measured between points A and B, the latter point of which is the "common" electrical point). Thus, for each half cycle of the power inverter 106 output one or the other of the $SCR_1$–$SCR_3$ rectifier set will conduct, thereby causing point A to be positive with respect to point B, or common. When the gate enabling flip-flop 108 changes state, that is, when $Q_{11}$ stops conducting and $Q_{10}$ begins conducting, the gates of $SCR_2$ and $SCR_4$ will receive trigger pulses during each half cycle of the power inverter 106 output. Under these conditions, either $SCR_2$ or $SCR_4$ will conduct, thereby causing point A to be negative with respect to point B. Thus, by the action of firing the silicon controlled rectifiers at controlled intervals by electrical pulsation from the gate enabling flip-flop 108 across the power inverter 106 output, the cycloinverter output acquires the frequency of the gate enabling flip-flop 108.

It is significant that once a silicon controlled rectifier is triggered, it will not turn off unless the current through the device can be forced to a relatively low level. This result is accomplished in the invention by effecting a reversal of the anode-cathode voltage utilizing the power inverter 106 during each half cycle of output. Thus, while trigger pulses from the gate enabling flip-flop 108 operate to turn a silicon controlled rectifier on, the power inverter 106 forces it off at the end of each half cycle by causing an anode-cathode voltage reversal in the rectifier.

Changes in heading of the electric motor of this invention are accomplished by application of mechanical features heretofore discussed and operated through the application of steering motor circuit 110.

In steering motor circuit 110 transformer $T_3$ is connected to the variable frequency output of power inverter 106 at secondary winding $W_2$ of transformer $T_2$, to provide steering energy. Secondary winding $W_2$ of $T_3$ is at a lower voltage level than the primary winding $W_1$ due to the selected turns ratio in that transformer. The voltage in $W_2$ is applied to the steering power supply circuit consisting of diodes $D_3$ and $D_4$ in connection with filter capacitors $C_{15}$ and $C_{16}$. The $D_3$-$C_{15}$ combination produces a negative voltage with respect to ground, while the $D_4$-$C_{16}$ elements produce voltages which are positive with respect to ground. These two voltage sources are used as collector supplying voltages for PNP transistor $Q_{16}$ and NPN transistor $Q_{17}$. The negative voltage is adapted for use with $Q_{16}$, while the positive voltage is designed for application to $Q_{17}$. Resistors $R_{41}$ and $R_{44}$ have essentially the same value, and serve to limit the currents in the base circuits of $Q_{16}$ and $Q_{17}$.

The wiper arm of variable resistor $R_{43}$ is mechanically connected to the electric motor, and is illustrated in FIG. 1 of the drawing as follow-up rheostat 109, mounted on bracket 19. Wiper arm of variable resistor $R_{42}$ is in turn connected to foot pedal control 35 via switch 34, illustrated in FIG. 4. If the wiper arms on both resistors $R_{42}$ and $R_{43}$ are in the same relative position, the base-emitter voltages of $Q_{16}$ and $Q_{17}$ are both zero, and no collector current flows in either transistor. However, if the wiper arm of $R_{42}$ is displaced relative to the position of the $R_{43}$ wiper arm by manipulation of clockwise-counterclockwise control 34, either a positive or a negative voltage develops at the common base connection of $Q_{16}$ and $Q_{17}$, depending upon the direction of manipulation of control 34. Thus, one of the other of these transistors is forced to conduct, a condition which causes either relay Rly 1, or Rly 2 to close. When the appropriate relay closes, steering motor 10, illustrated in FIG. 1 and FIG. 5, begins to rotate in a clockwise or counterclockwise direction, depending upon the direction of manipulation of control 34. The direction of rotation is such that the wiper arm connected to $R_{43}$ is moved toward the same position on $R_{43}$ as the wiper arm of $R_{42}$ is positioned on that resistor. When these arms reach essentially the same relative position through motor rotation, the closed relay automatically opens, thereby removing power from steering motor 10 and terminating further motor rotation.

As previously noted, steering motor 10 is preferably a permanent-split capacitor electric motor. Both windings $SMW_1$ and $SMW_2$ as illustrated in FIG. 7B are connected to one side of the common line. Capacitor $C_{17}$ is connected in series with $SMW_2$ when Rly 1 is closed, and alternatively, is placed in series with $SMW_1$ when Rly 2 is closed. The winding not placed in series with $C_{17}$ is connected directly to the cycloinverter output at point B. It will be appreciated that it is necessary to provide a relatively high, properly phased current in the steering motor 10 windings $SMW_1$ and $SMW_2$, in order that the motor function properly. Since frequency variation across $C_{17}$ causes the impedance of that capacitor to rise thus reducing current flow and changing phasing relationships, it may be desirable in certain aspects of the invention to adapt $C_{17}$ such that it will change impedance as the circuit frequency changes. This may be accomplished for example, by placing inductance in series with $C_{17}$ to properly adjust the winding current flow. The steering motor circuity, which effects a switching of $C_{17}$ from one winding to the other, causes steering motor 10, FIG. 1, to rotate in opposite directions upon closure of the appropriate relay.

As hereinbefore discussed, this steering system is known as a maximum effort control system, since voltage is applied to steering motor 10 illustrated in FIG. 1, during the entire length of time in which the windings of that motor are energized. Resistors $R_{45}$ and $R_{46}$ serve a dual purpose in this system; they operate to suppress spark formation at the relay contacts when these contacts are opened, and they offer a resistive component to the loading of the cycloinverter. This loading component is necessary to reduce the transient voltage spikes which result from pulsing of the currents in the windings of power motor 25 in FIG. 1 and steering motor 10.

Like steering motor 10, power motor 25, illustrated in FIG. 1, is preferably a permanent-split capacitor, induction motor. As illustrated in FIG. 7B, power motor circuit 111 contains main power motor winding $PMW_1$, which is connected directly to the output of the cycloinverter, at points A and B. Switch $S_2$ corresponds to switch 32 on foot control 35, shown in FIG. 4, and provides for reversal of power motor 25. This switching is accomplished by permitting series capacitor $C_{18}$ and power motor winding $PMW_2$ to be switched relative to $PMW_1$, which results in a reversal of power motor direction.

Description of the preferred Embodiments

It will be recognized by those skilled in the art that there are many systems available for controlled operation of alternating current electric motors by application of electrical pulses in a selected manner. In a preferred embodiment of this invention, the pulse application is achieved by a novel cycloinverter circuit, the output of which is selectively adjusted by an electrical gate operating to electronically screen the pulses applied to the motor being driven, in a manner heretofore particularly described, and further hereinafter emphasized.

The cycloinverter circuit utilized to drive the central or power motor in a preferred application of this invention may be more particularly characterized as a circuit for triggering electrical pulses, and an inverter circuit for receiving these pulses and applying a variable frequency output to the power motor. These circuits are in turn coupled to a gate control circuit which interconnects and controls the electrical gate discussed above. The inverter circuit operates to apply electrical pulses having a selected repetition frequency (time between pulses) and wave characteristic (determined by the trigger circuit) to the power motor. This output is in turn selectively altered by the gate control circuit and gate to provide a controllable signal effecting the desired speed control of the power motor. Desired motor speed control is achieved by varying the inverter frequency and gate control frequency in inverse fashion, preferably by use of a single potentiometer, designated by reference numeral $R_1$ illustrated in FIG. 7A of the drawing. Variation of the motor speed is achieved by manipulation of controls which supply input signals to the trigger circuit, which in turn dictates the nature of the inverter and gate control circuit signals, and ultimately, the signal impressed on the power motor windings.

Referring again to FIGS. 7A and 7B of the drawing, the inverter circuit broadly included in the above described embodiment of the invention is composed of a power inverter drive 105 and power inverter 106, while the gate and gate control circuit previously described are included in the SCR gate and output 109. The remaining elements of the cycloinverter circuit, which broadly comprise the pulse trigger circuit of this inventive embodiment, are: the inverter trigger 101, driver amplifier 102, monostable synchronizer 103, power supply filter 104, gate enabling trigger 107, and the gate enabling flip-flop 108. Detailed functions of these circuits have been previously discussed and are included in further embodiments of the invention hereinafter described.

In another preferred aspect of the invention, the gate and gate control circuit (SCR gate and output 109 illustrated in FIG. 7B) included in the above described aspect of the invention, are characterized by a plurality of silicon controlled rectifiers designated $SCR_1$, $SCR_2$, $SCR_3$, and $SCR_4$. These rectifiers are alternately activated in pairs by the cycloinverter pulse trigger circuit to produce a wave form having a series of positive pulses alternating with a series of negative pulses applied through the inverter circuit output to the power motor. Thus, controlled firing of these rectifiers operates to alter the signal produced by the inverter circuit and control the speed of the power motor in a desired manner.

From a discussion of the preceding embodiments of the invention it will be recognized that in a basic design the cycloinverter circuity is characterized by a means for generating at least one electrical signal having a time repeating waveform, which signal is applied to power motor 25 illustrated in FIG. 1. By the term "time repeating" waveform is meant an alternating variation of the voltage pulsations from a positive characteristic to a negative characteristic (with respect to common). It is also apparent that the cycloinverter circuit must contain a component combination which operates to control the repetition frequency, or time between electrical pulses, of such a waveform. While there are many techniques known to those skilled in the art for achieving this result, the waveform generation and repetition frequency control is preferably effected according to hereinafter more particularly described embodiments of the invention.

In a preferred aspect of the invention, as illustrated in FIGS. 7A and 7B, the gate control circuit (SCR gate and output 109) output is responsive to a time repeating waveform preferably generated in the gate enabling flipflop 108, and a synchronizing signal, preferably from the monostable synchronizer 103, the latter circuit functioning to ensure that silicon controlled rectifiers $SCR_1$, $SCR_2$, $SCR_3$ and $SCR_4$ are fired alternatively in a selected time interval for proper speed control of the motor.

Although as noted, it is preferable to utilize the gate enabling flip-flop 108 and monostable synchronizer 103, circuits to generate the alternating and synchronizing signals, respectively, for application to the gate control circuit, it will be appreciated that alternate circuitry known to those skilled in the art may be utilized to achieve the same result in the gate control circuit.

Referring again to FIG. 1 of the drawing, in another embodiment featuring novel steering aspects of the invention, there is provided an electric motor system adapted for propelling a watercraft which includes an alternating current power motor 25, a steering mechanism coupled to shaft 5 and upper support shaft 5A which support power motor 25, which mechanism is designed to achieve a desired heading of the watercraft, and a means for positioning the power motor and steering mechanism which is responsive to changes in the steering mechanism. The positioning means is adapted so as to be responsive to the operator's signal and preferably, automatically operates to change the heading of the power motor through activation of the steering mechanism, although it will be appreciated that this operation may be effected manually by the operator.

In a most preferred aspect of this embodiment of the invention, the steering mechanism and power motor are electrically interrelated through a maximum effort steering feedback system. This system operates to maintain a desired power motor 25, and watercraft heading by electrically activating the steering mechanism through an appropriate control system manipulated by the operator, illustrated by remote control 35 in FIG. 4. Activation of the steering mechanism causes rotation of power motor 25 in a desired direction thereby achieving directional control of the watercraft. While, as previously noted, it will be appreciated that the above steering mechanics may be accomplished in many ways, the system of this invention is preferably completely automated, operating to steer the watercraft at a single touch of the controls illustrated in FIG. 4. This result is accomplished by the provision of two variable electrical conditions, one of which is coupled to the power motor responsive to changes in heading of the motor, and the other to the steering mechanism, responsive to changes therein initiated by central controls 35. These electrical conditions are in turn in electrical cooperation with a "feedback" system for comparing the two electrical conditions, and adapted to effect a power motor position in accordance with a desired difference between these two electrical conditions. Thus, the operator may activate the electrical condition located in the steering mechanism through manipulation of master control 35, which action will in turn cause the electrical condition in the power motor to be activated, and thereby cause the motor to be rotated.

While it will be appreciated that these electrical conditions may be effected and interrelated in a variety of ways using different equipment by techniques known to those skilled in the art, the system of this invention is preferably characterized by using variable resistors to achieve the desired electrical conditions for power motor directional control.

It will further be appreciated that the mechanism utilized to produce the desired torque for shaft rotation and position of power motor 25 in FIG. 1, may take many forms. For example, this torque may be applied manually or by a system of pulleys and cables, as in many conventional systems. In a preferred aspect of this invention however, power motor rotation torque is achieved by application of an electric steering motor 10, illustrated in FIG. 1 of the drawing, in cooperation with a gearbox 22, belt 16, and pulleys 14 and 15, as will be more fully described hereinafter. Since rotation of power motor 25 in both directions is desired for maximum directional positioning, electric steering motor 10 is preferably a reversible induction machine. In this regard, since reversing of power motor 25 is also desirable to eliminate the necessity for cables and pulleys designed to physically rotate the motor and shaft, the electric motor system of this invention is provided with circuitry (illustrated in power motor circuit 111, FIG. 7B) to effect reversal of the power motor, a provision which is discussed more in detail hereinafter.

In its simplest form, the electric motor of this invention is illustrated in FIG. 1 of the drawing, and is designed to propel a watercraft. The motor preferably consists of an electric induction power motor 25, equipped with propellor 4, support shaft 5 and upper support shaft 5A, as well as mounting bracket 6, the latter adapted for attaching the motor to the watercraft. In order to provide convenient steering, mounting bracket 6 may be fitted with a sleeve 7 adapted to receive upper support shaft 5A. Suitable steering apparatus may further be mounted to upper support shaft 5A in order to facilitate controlled rotation of motor 25.

While many steering mechanisms for directional positioning of electric motors such as the one described herein are known to those skilled in the art, according to a preferred aspect of this invention steering is accomplished by use of a steering motor 10 (preferably reversible), in cooperation with gearbox 22, having gears in connection with upper support shaft 5A to permit controlled rotation of the shaft when the steering motor is activated.

As heretofore noted, the steering motor is preferably reversible in order to provide convenient rotation of shaft 5 and upper support shaft 5A in either direction. This motor may further be characterized as a split-capacitor, multipole induction machine, although it will be recognized that a direct current motor may also be utilized in the steering apparatus of this invention. When an alternating current, reversible machine is utilized as the steering mechanism for the electric motor of this invention, the motor size will, of course, depend upon the size and weight of the power motor unit. Under conditions where power motor 25 is about 1/7 horsepower in rated output, steering motor 10 is preferably about 1/100 horsepower, and both machines are ideally, multipole, two phase motors. Most preferably, the power motor is characterized by split-capacitor, 4 pole, 2 phase design, and the steering motor, 2 pole, 2 phase design, although it will be recognized that other induction machines known to those skilled in the art may also be utilized in the invention with favorable results. Furthermore, in order to expedite cost factors, the stators of these motors are preferably conventionally wound.

Figure 3:
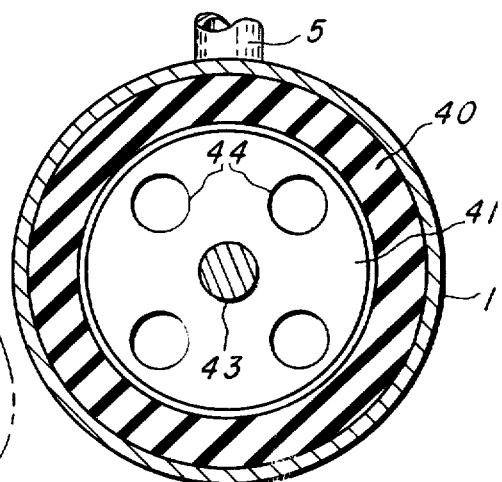
FIG. 3 is a front sectional view of the power motor unit illustrated in FIG. 2.

It will be recognized that the interior of power motor 25 must be protected from electrical shorting due to water contact while operating under submerged conditions. Consequently, either the motor housing 1 illustrated in FIG. 1 of the drawings must be sealed, or the stator windings of motor 25 must be encapsulated, as illustrated in FIG. 3 of the drawing. In a preferred embodiment of this invention, the latter technique is utilized to prevent electrical shorting of the motor windings. An appropriate coating 40, shown in FIG. 3, which is know to those skilled in the art may be applied to that stator windings of motor 25; it is preferred to utilize a thermoplastic or thermoresin material such as epoxy in a "potting" operation, to provide a good stator seal which is capable of withstanding stress introduced during motor operation. Any suitable technique known to the skilled artisan may be utilized to encapsulate or pot the stator windings, such as pulling a vacuum on the windings, introducing the potting material into the vacuum chamber, and effecting the desired encapsulation in this environment.

It should also be noted that rotor 41, of power motor 25 should also be coated with a protective material such as epoxy in order to ensure maximum underwater life. Further, motor bearings (not illustrated) are preferably machined of a water-impervious and insulating material such as teflon, to prevent water damage and undesirable electrical conduction. It will be recognized that other materials possessing the characteristics of swell resistance to water and electrical insulation may be utilized in the electric motor of this invention, according to the specialized knowledge of those skilled in the art.

In a preferred aspect of the invention wherein an electric motor having encapsulated stator windings 40, as shown in FIG. 3, is utilized, it is also preferred that motor end bells 26, illustrated in FIG. 1, be equipped with drain ports 2 to allow water flow into and out of the interior of the motor in order to facilitate operational cooling and drainage when the motor is removed from the water. These drain ports may further be screened to prevent detrimental entry of marine life or debris into the interior of the motor.

Figure 5:
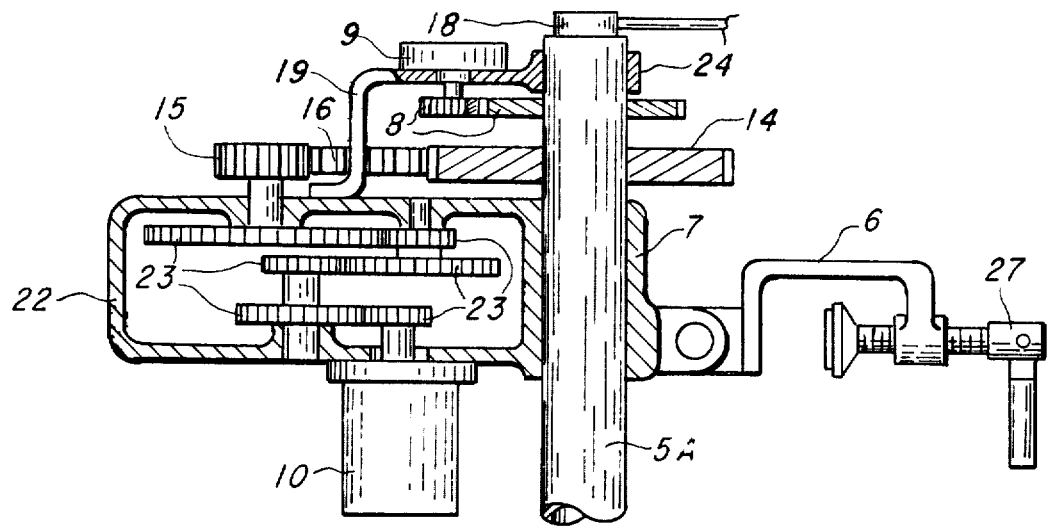
FIG. 5 is a side sectional view of the steering mechanism of the electric motor illustrated in FIG. 1.

Accordingly, in a more preferred embodiment of this invention there is provided an electric motor illustrated in FIGS. 1–5 of the drawing adapted for propelling watercraft, which motor is characterized by a reversible, alternating current, induction motor 25, fitted with propellor 4, and having encapsulated stator windings 40 and end bells 26, containing drain ports 2. Motor 25 also preferably contains insulated, swell-resistant bearings and is mounted on a substantially rigid support shaft 5, preferably constructed of stainless steel. At the top end of upper shaft 5A is affixed bracket 6, containing sleeve 7 adapted to movably receive this shaft, which bracket is equipped with a clamp 27, for securing the electric motor to a watercraft and shaft clamp 28 for adjusting the length of shaft 5 and upper shaft 5A. Belt 16 is also connected to upper shaft 5A to permit rotation of the shaft by application of pressure in a desired direction on the belt, and a system of gears 23, in gearbox 22 are preferably in mechanical attachment to belt 16 for appling the desired pressure. It will be appreciated from a discussion of preceding inventive embodiments that gears 23 in mechanical attachment to belt 16, can be driven by any number of means according to the knowledge of those skilled in the art. However, in a preferred aspect of the invention, as in previously discussed embodiments, gears 23 are preferably in mechanical cooperation with a steering motor 10, as illustrated in FIGS. 1 and 5. While this motor may be characterized by direct current, nonreversible or reversible operation, it is preferably a reversible, induction machine for easy integration into the electronic circuitry of the invention, and expeditious operation of the steering mechanism. This preferred steering embodiment of the invention is lastly characterized by application of an electronic circuit, the operation of which has been previously described, which is designed to effect desired speed and directional control of the electric motor.

It is significant in the invention that by application of appropriate electronic circuitry, control of the electric motor system can be achieved from a point substantially remotely located from the motor itself. Since it is frequently desirable to operate such a motor with the hands free, the remote control unit may be placed near the feet in the watercraft as previously mentioned, and adapted for foot control operation as illustrated in FIG. 4 of the drawing. The foot control unit 35, illustrated in FIG. 4 may be connected to the electric motor unit 25, through shaft 5 and upper support shaft 5A by electric wires 11, 12, and 13 via cable 20, shown in FIG. 1, or electronically by other techniques known to the skilled artisan. Foot control 35 may also be constructed such that housing 30 encases the electronic circuit illustrated in FIG. 7 of the drawing, in addition to performing control operations hereinafter discussed. However, in a preferred aspect of the invention, the electronic circuit is sealed in a waterproof compartment remotely located from the motor and control pedal.

Foot control 35 as illustrated in FIG. 4 is designed to provide maximum motor control manipulation with minimum effort on the part of the operator. Housing 30 is adapted to receive switch 31, which may alternatively be characterized as a pressure switch or other on-off control device known to those skilled in the art. Forward-reverse switch 32, is conveniently located for toe operation, but may also be alternately characterized as a pressure or other type switch without departing from the spirit and scope of the invention. Likewise, clockwise-counterclockwise control 34, may easily be operated by the ball of the foot, and forward-reverse control 36, in like manner. It should be noted that controls 34 and 36 may further be combined in a single plate which permits clockwise-counterclockwise motor operation when the foot is tilted from side to side, and forward-reverse control when rocked from toe to heel. Other control variations which may be utilized in the invention will be apparent to those skilled in the art. Foot control 35 is also equipped with electric conduits 33 and 37, which communicate with a source of direct current 50, illustrated in FIG. 6 and are utilized to activate the electronic circuit illustrated in FIGS. 7A and 7B of the invention.

In a most preferred embodiment of the invention illustrated in FIG. 1, the electric motor is characterized by an electric power motor 25 equipped with propellor 4, motor 25 being also attached to a substantially rigid, corrosion resistant, support shaft 5 to which is further attached upper support shaft 5A. A mounting bracket 6 and sleeve 7 is also adapted to fit upper shaft 5A. As in previously discused embodiments, mounting bracket 6 is fitted with clamp 27 for attachment to the watercraft, and gearbox 22, to the latter of which is mounted a pulley 15, connected to gears 23, (illustrated in FIG. 5) located inside gearbox 22. A second pulley 14, is mounted on upper shaft 5A, in substantially the same horizontal plane with pulley 15, which is in turn affixed to gearbox 22. Flexible belt 16 is adapted to connect the two pulleys such that when the gears in gearbox 22 are rotated in a selected direction, upper shaft 5A and shaft 5 also turn in that direction through the action of belt 16 on pulleys 14 and 15.

It is apparent that gearbox 22, may be rotated by substantially any means; however, as in previous embodiments of the invention, the gears are preferably connected to an electric motor, and most preferably, an electric induction steering motor 10, illustrated in FIG. 1. Furthermore, while the power motor 25 may be constructed with a sealed, water proof housing, this motor is preferably built with encapsulated stator windings 40, illustrated in FIG. 3, to prevent electrical shorting under submerged conditions. It is also preferably equipped with end bells 26, having screened apertures 2, to allow a free flow of water into and from the interior of the motor.

As previously discussed, the electric motor of this invention is preferably characterized by a steering mechanism responsive to changes in a steering mechanism electrical condition, and a power motor electrical condition. These conditions are most preferably presented in the invention by utilizing a follow-up rheostat 9, geared to shaft 5A, which is responsive to both of the electrical conditions, and which serves to allow controlled changes in the power motor heading responsive to changes activated in the steering mechanism from foot control 35, and, in particular, switch 34, shown in FIG. 4.

In another most preferred aspect of the invention, steering motor 10 is characterized as a reversible, electric induction machine, and follow-up rheostat 9 is installed to cooperate with steering motor 10 in the steering mechanism, to achieve positive directional control through activation of switch 34, mounted on foot control 35 substantially as illustrated in FIG. 4.

Furthermore, under design conditions where steering motor 10 and follow-up rheostat 9 cooperate to achieve close motor directional control, it is also desirable to utilize a power motor 25, which is characterized by encapsulated stator windings 40, illustrated in FIG. 3, and end bells 26, fitted with screened apertures 2, shown in FIG. 1.

The particular technique for driving power motor 25 and operating steering motor 10, as above characterized in this most preferred aspect of the invention, is by application of a cycloinverter circuit and steering motor circuit 110 as illustrated in FIGS. 7A and 7B of the drawing, these circuits being activated by impressing a direct current voltage thereon as illustrated in the block diagram of FIG. 6, through manipulation of foot control 35 shown in FIG. 4.

The cycloinverter circuit utilized in this invention has been previously described in detail in connection with the drawings, and FIGS. 7A and 7B in particular. The above most preferred embodiment of the invention is characterized by a cycloinverter circuit having the following circuits described with reference to FIG. 8 which is a functional block diagram of the detailed circuitry of FIGS. 7A and 7B of the drawing: A pulse generating inverter trigger 101 for activation of other cycloinverter component circuits hereinafter described; driver amplifier 102 electrically connected to inverter trigger 101 in order to amplify the pulses generated by the latter; monostable synchronizer 103 connected electronically to the driver amplifier 102 to effect pulse synchronizing in other cycloinverter circuits; power supply filter 104 in connection with the monostable synchronizer 103 and other component circuits for providing a substantially constant voltage supply to selected cycloinverter circuits; power inverter drive 105, which connects with the power supply filter circuit and functions to provide a variable frequency base current drive to selected portions of the cycloinverter circuit; power inverter 106, electrically connected to the power inverter driver 105, in order to convert the low voltage, direct current output from the latter to a higher voltage, variable frequency, alternating signal at a relatively high power level for conversion and impression on power motor 25, shown in FIG. 1; a gate enabling trigger 107 connected to the inverter trigger 101 adapted to supply a second pulse synchronizing signal to other cycloinverter components; a gate enabling flip-flop 108 adapted to receive electrical pulses from the gate enabling trigger 107 to establish the cycloinverter output frequency; and a silicon controlled rectifier gate and output circuit 109 containing several silicon controlled rectifiers which are gated to the power inverter 106 and connected to the gate enabling trigger 107, to drive the rectifiers in a spaced and timed sequence dictated by the gate enabling trigger.

In a final aspect of this most preferred embodiment of the invention, the electric motor system is preferably equipped with a power motor circuit 111, illustrated in FIG. 7B which serves to reverse power motor 25, shown in FIG. 1, through the action of switch 32 mounted on foot control 35, illustrated in FIG. 4 of the drawing.

As previously discussed, and referring to FIG. 5 of the drawing, the primary energy source for the electric motor system of the invention is a battery or direct current voltage source 50. The direct current from this energy source is converted to an alternating characteristic by application of a frequency controlled cycloinverter, 51. This unit basically consists of a relatively high frequency power inverter 106, illustrated in FIG. 7A, the output of which is gated to the power motor 25, at a lower frequency, by a group of frequency controlled rectifiers (SCR gate and output circuit 109, FIG. 7B). A novel feature of the invention thus lies in variation of both the gating frequency and the power inverter frequency in inverse relationship to achieve the desired motor speed control. Current to the power motor is varied by altering the inverter frequency; thus, an increased frequency in the power inverter circuit results in a decreased frequency in the gating circuit, which effectively changes the current in the power motor. Such variation is made possible by application of a potentiometer having variable resistance, as illustrated by $R_1$ in the inverter trigger 101 and gate enabling trigger 107 of FIG. 7A and FIG. 8. As the speed control input to the cycloinverter changes, the gating frequency, and accordingly, the cycloinverter output frequency changes. Lower frequency applied through the cycloinverter 51 results in a lower motor speed, and vice versa.

Figure 8:
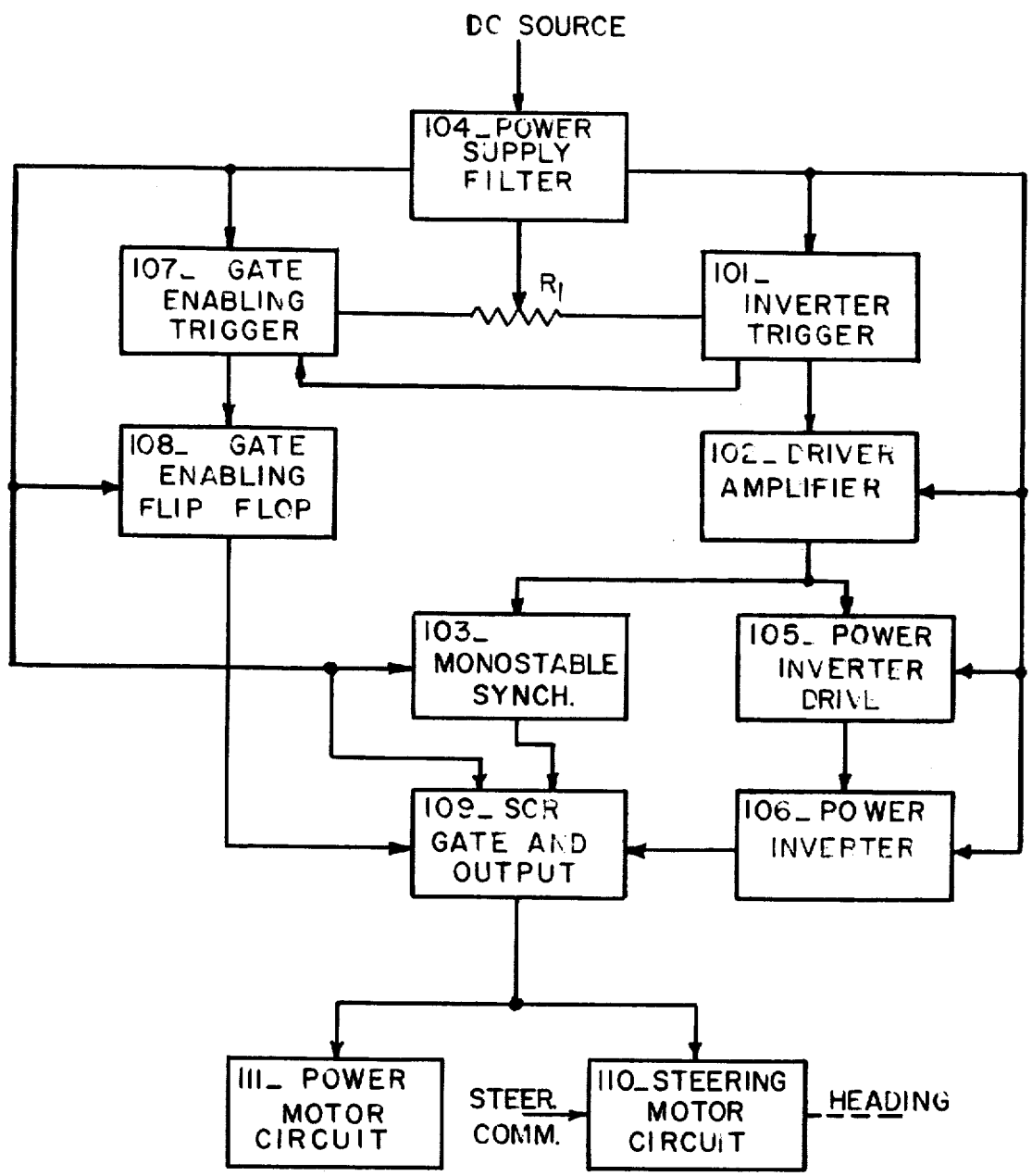
FIG. 8 is an overall block diagram of the detailed circuitry of FIGS. 7A and 7B.
Figure 9:
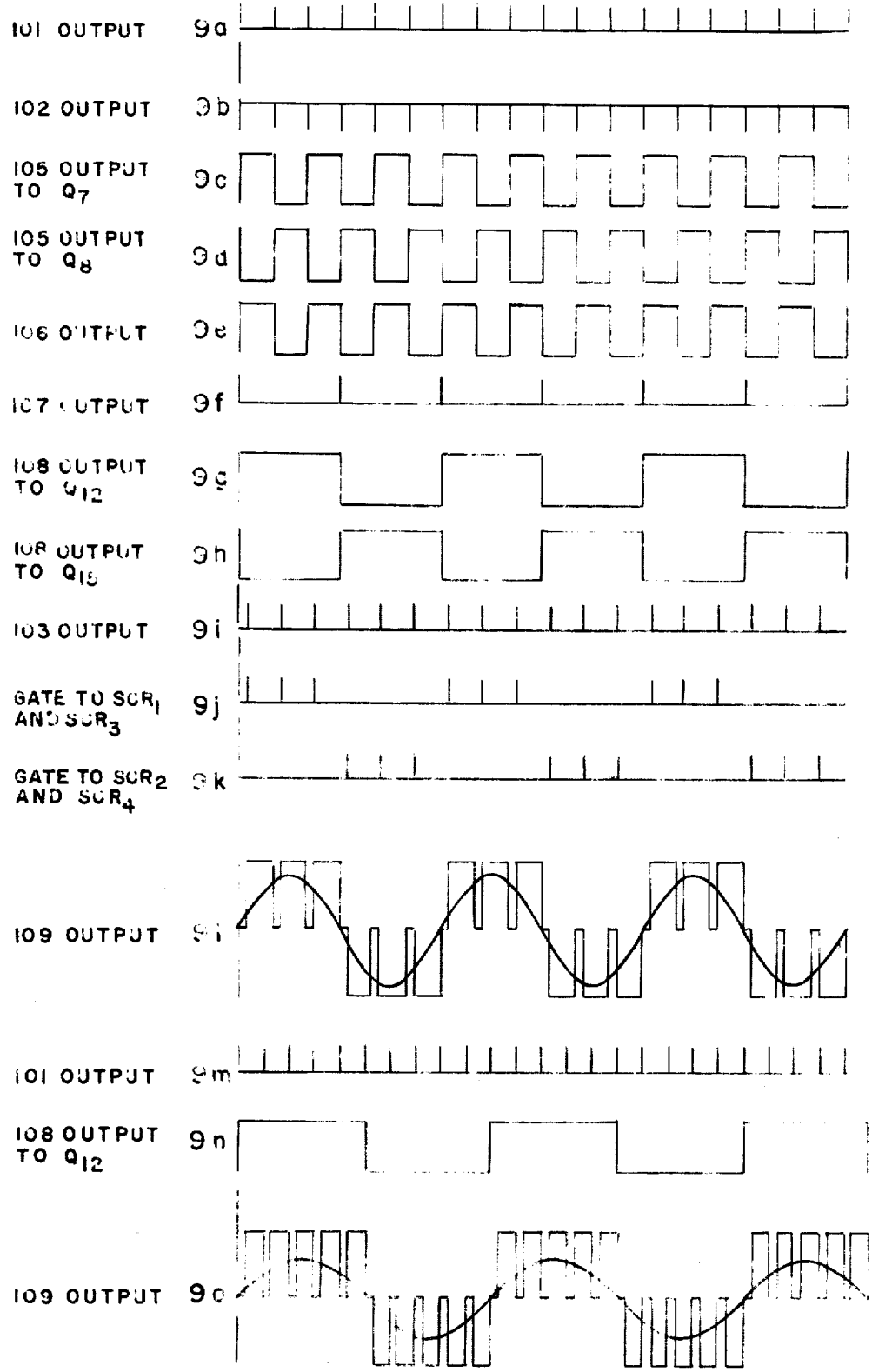
FIG. 9 shows representative waveforms selected at appropriate points in FIG. 8.

These features are brought forth graphically by FIG. 9 which discloses representative output waveforms from FIGS. 8, 7A and 7B. Note especially waveforms 9(*i*) and 9 (*o*) wherein the inverse relationship is clearly shown. The speed control input to the cycloinverter is mechanically connected to foot control 35 illustrated in FIG. 4. Also to be noted is the cycloinverter connection to the steering circuit 52, in FIG. 6, which effects a speed change in the steering motor 10, corresponding proportionately to the change in speed of power motor 25. Thus, when power motor 25 illustrated in FIG. 1 and FIG. 6, slows down, steering motor 10 does likewise, both in response to the operator's manipulation of speed control 36 mounted on foot control 35, illustrated in FIG. 4, in the S or slow direction.

While it will be appreciated from a consideration of the circuit illustrated in FIGS. 7A and 7B that the respective circuit components may be varied to achieve desired alterations in circuit performance, in a most preferred embodiment of the invention these values are as listed in the following table.

| Circuit Element | Value | | Circuit Element | Value | |
|---|---|---|---|---|---|
| $R_1$ | 100,000 | ohms | $R_{35}$ | 510 | ohms |
| $R_2$ | 62,000 | " | $R_{36}$ | 510 | " |
| $R_3$ | 270 | " | $R_{37}$ | 390 | " |
| $R_4$ | 100 | " | $R_{38}$ | 4300 | " |
| $R_5$ | 510 | " | $R_{39}$ | 10,000 | " |
| $R_6$ | 390 | " | $R_{40}$ | 1000 | " |
| $R_7$ | 1,000 | " | $R_{41}$ | 180 | " |
| $R_8$ | 12,000 | " | $R_{42}$ | 1000 | " |
| $R_9$ | 100 | " | $R_{43}$ | 1000 | " |
| $R_{10}$ | 390 | " | $R_{44}$ | 180 | " |
| $R_{11}$ | 4700 | " | $R_{45}$ | 3000 | " |
| $R_{12}$ | 4700 | " | $R_{46}$ | 300 | " |
| $R_{13}$ | 47 | " | $C_1$ | 0.01 | ufd |
| $R_{14}$ | 390 | " | $C_2$ | 560 | " |
| $R_{15}$ | 1.1 | " | $C_3$ | 0.10 | " |
| $R_{16}$ | 390 | " | $C_4$ | 0.10 | " |
| $R_{17}$ | 390 | " | $C_5$ | 0.10 | " |
| $R_{18}$ | 120 | " | $C_6$ | 0.003 | " |
| $R_{19}$ | 120 | " | $C_7$ | 0.10 | " |
| $R_{20}$ | 72,000 | " | $C_8$ | 250 | " |
| $R_{21}$ | 20,000 | " | $C_9$ | 250 | " |
| $R_{22}$ | 270 | " | $C_{10}$ | 0.01 | " |
| $R_{23}$ | 120 | " | $C_{11}$ | 0.047 | " |
| $R_{24}$ | 330 | " | $C_{12}$ | 0.047 | " |
| $r_{25}$ | 1000 | " | $C_{13}$ | 0.10 | " |
| $R_{26}$ | 470 | " | $C_{14}$ | 0.10 | " |
| $R_{27}$ | 51 | " | $C_{15}$ | 82 | " |
| $R_{28}$ | 1000 | " | $C_{16}$ | 82 | " |
| $R_{29}$ | 470 | " | $C_{17}$ | 9 | " |
| $R_{30}$ | 330 | " | $C_{18}$ | 9 | " |
| $R_{31}$ | 1000 | " | $Q_1$ | 2N4871 | |
| $R_{32}$ | 4300 | " | $Q_2$ | 2N3704 | |
| $R_{33}$ | 10,000 | " | $Q_3$ | 2N3704 | |
| $R_{34}$ | 390 | " | $Q_4$ | 2N3704 | |
| $T_1(W_1)$ | 2.25 Watt center tap | | $Q_5$ | 2N4921 | |
| $T_1(W_2)$ | 16 Ohms center tap | | $Q_6$ | 2N4921 | |
| | | | $Q_7$ | 2N2152 | |
| $T_2(W_1)$ | 24 Volt center tap | | $Q_8$ | 2N2152 | |
| $T_2(W_2)$ | 230 Volt center tap | | $Q_9$ | 2N4871 | |
| | | | $Q_{10}$ | 2N3704 | |
| $T_3(W_1)$ | 115 Volt | | $Q_{11}$ | 2N3704 | |
| $T_3(W_2)$ | 6.3 Volt center tap | | $Q_{12}$ | 2N3704 | |
| $T_4$ | Pulse transformer, 1:1:1:1 turn ratio | | $Q_{13}$ | 2N4871 | |
| $T_5$ | Pulse transformer 1:1:1 turns ratio | | $Q_{14}$ | 2N4871 | |
| $Rly_1$ | Single pole, double throw | | $Q_{15}$ | 2N3704 | |
| $Rly_2$ | Single pole, double throw | | $Q_{16}$ | 2N3703 | |
| $D_1$ | A14F | | $Q_{17}$ | 2N3704 | |
| $D_2$ | A14F | | $SCR_1$ | 2N4443 | |
| $D_3$ | A14F | | $SCR_2$ | 2N4443 | |
| $D_4$ | A14F | | $SCR_3$ | 2N4443 | |
| | | | $SCR_4$ | 2N4443 | |

Although the principal application of this invention is to an improved electric motor system for mounting on watercraft to propel the watercraft, it will be appreciated by those skilled in the art that the invention can be utilized for other purposes as well. For example, the system might be applied to industrial mixing operations where it is desired to rotate the mixer shaft and achieve close speed control of the mixing motor. Alternatively, the electronic circuitry and remote control system of the invention might be utilized to operate induction machines in substantially any application where positive speed control is desired. Still other applications of the invention will be apparent according to the knowledge of the skilled artisan.

What is claimed is:

1. An electric motor system comprising:
   a. An electric motor, the speed of which is a function of the frequency applied thereto,
   b. A source of electrical pulses having a controllable frequency to drive said motor, and
   c. A gate interconnecting said motor and said source of electrical pulses to invert the half cycle polarity of said controllable frequency during a predetermined gating period, inversely proportional to said controllable frequency, to be applied to said motor to control its speed and the power applied thereto, said gate passing an increased number of adjacent pulses of the same half cycle polarity, each pulse having a decreased period, when said gating period is increased, thereby decreasing the effective voltage applied to said motor.

2. The electric motor system of claim 1 wherein said source of electrical pulses and said gate comprise a cycloinverter circuit.

3. The electric motor system of claim 2 wherein said cycloinverter circuit further comprises:
   a. an inverter circuit having an output with a variable frequency component to drive said motor,
   b. trigger means applied to said inverter circuit for activating said output and for controlling said variable frequency component thereof, and
   c. a gate control circuit interconnecting said gate, said inverter circuit and said motor to invert the half cycle polarity of said variable frequency component during a predetermined period, inversely proportional to the frequency of said variable frequency component, whereby the speed of said motor is altered as said selectable portion of the output of said inverter circuit is varied.

4. The electric motor system of claim 3 wherein said gate comprises a plurality of silicon controlled rectifiers activated alternately in pairs by a trigger signal produced by said trigger means and received by said gate control circuit, to produce a waveform having a series of positive pulses alternating with a series of negative pulses applied to said motor.

5. The electric motor system of claim 4 wherein said trigger means for activating said output comprises:
   a. means located in said cycloinverter circuit for generating an electrical signal having a first time repeating waveform for application to said power motor, and
   b. means for controlling the repetition frequency of said waveform.

6. The electric motor system of claim 5 further comprising:
   a. means for generating an electrical signal having a second time repeating waveform for application to said gate control circuit, and
   b. means for generating a synchronizing signal applied to said gate control circuit to ensure that said gate functions to pass said pulses at a predetermined time.

7. A cycloinverter circuit for operating an electric motor in a selected manner which comprises:
   a. a pulse generating inverter trigger for initiation of response in selected other circuit components of said cycloinverter circuit;
   b. a driver amplifier in electrical cooperation with said inverter trigger for amplifying pulses received from said pulse generating;
   c. a monostable synchronizer in connection with said driver amplifier to facilitate a first pulse synchronization in selected cycloinverter circuit components;
   d. a power supply filter in electrical connection with said monostable synchronizer for providing a substantially constant voltage supply to other segments of said cycloinverter circuit;
   e. a power inverter drive in electrical cooperation with said power supply filter and said driver amplifier to provide a variable frequency base current drive output to selected portions of said cycloinverter circuit for activation thereof;
   f. a power inverter in electrical connection with said power inverter drive for converting a low voltage direct current output generated in said power inverter drive to a higher voltage, alternating signal at a substantially high power level for operating said power motor;
   g. a gate enabling flip-flop adapted to receive pulses from said gate enabling trigger for establishing the output frequency of said cycloinverter circuit;
   i. a silicon controlled rectifier gate and output circuit containing a plurality of silicon controlled rectifiers gated to said power inverter and adapted to receive synchronizing signals from said gate enabling trigger and said gate enabling flip-flop, for driving said silicon controlled rectifiers in a desired spaced and timed sequence dictated by said gate enabling trigger and said gate enabling flip-flop; and
   j. A power motor circuit in connection with said cycloinverter circuit for effecting forward and reverse operation of said power motor.

8. The cycloinverter circuit of claim 7 further comprising a variable resistor connected in inverse relationship to said inverter trigger and said gate enabling trigger whereby when a signal is applied to said variable resistor from said control unit, a first current is applied to said inverter trigger and a second current is applied to said gate enabling trigger, said first current and said second current varying in inverse relationship to each other.

9. The cycloinverter circuit of claim 8 wherein said SCR gate and output further comprises:
   a. a first and second set of silicon controlled rectifiers, the output of which is in electrical cooperation with said power inverter output,
   b. a first and second transistor system in electrical cooperation with said first and second set of silicon controlled rectifiers, respectively,
   c. means located in said gate enabling flip-flop connected to said first and second transistor system for alternately causing each of said first and second transistor system to remain in a non-conducting state, and d. means located in said monostable synchronizer in electrical connection with said first and second transistor system for applying a negative voltage pulse at selected intervals to said first and second transistor systems whereby the one of said transistor systems which is not in a non-conducting state conducts and effects firing of one set of said first and second set of silicon controlled rectifiers.

10. The cycloinverter circuit of claim 9 wherein said means located in said monostable synchronizer further comprises:

a. first and second transistor systems in electrical co-operation, and b. means located in said driver amplifier for applying a negative voltage pulse to the one of said first and second transistor systems which is conducting to effect synchronizing of said SCR gate and output.

* * * * *